US012739346B2

(12) United States Patent
Lin et al.

(10) Patent No.: US 12,739,346 B2
(45) Date of Patent: Sep. 15, 2026

(54) USER-SELECTED VIEWPOINT RENDERING OF A VIRTUAL MEETING

(71) Applicant: Google LLC, Mountain View, CA (US)

(72) Inventors: Jamie Menjay Lin, San Diego, CA (US); Yu-Hui Chen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 174 days.

(21) Appl. No.: 18/316,136

(22) Filed: May 11, 2023

(65) Prior Publication Data

US 2024/0380865 A1 Nov. 14, 2024

(51) Int. Cl.

| | |
|---|---|
| ***H04N 7/15*** | (2006.01) |
| ***G06F 3/04842*** | (2022.01) |
| ***G06V 10/56*** | (2022.01) |
| ***G06V 10/74*** | (2022.01) |
| ***H04N 7/14*** | (2006.01) |

(52) U.S. Cl.

CPC ......... *H04N 7/157* (2013.01); *G06F 3/04842* (2013.01); *G06V 10/56* (2022.01); *G06V 10/761* (2022.01); *H04N 7/147* (2013.01); *H04N 7/152* (2013.01)

(58) Field of Classification Search

None

See application file for complete search history.

(56) References Cited

U.S. PATENT DOCUMENTS

2019/0378333 A1* 12/2019 Castaneda ............... G06T 7/251
2020/0322395 A1* 10/2020 Copley .................. H04N 7/157
2020/0388068 A1 12/2020 Yeung et al.
2021/0136342 A1* 5/2021 Bina .................... H04N 13/344
2021/0312698 A1 10/2021 He et al.

(Continued)

FOREIGN PATENT DOCUMENTS

WO 2023113948 A1 6/2023

OTHER PUBLICATIONS

Jason Lawrence et al., "Project Starline: A high-fidelity telepresence system", ACM Transactions on Graphics vol. 40, No. 6, Article 242, Dec. 2021, pp. 242:1-242:13, Appendices three pages.

(Continued)

*Primary Examiner* — Hemant S Patel

(74) *Attorney, Agent, or Firm* — Lowenstein Sandler LLP

(57) ABSTRACT

Methods and systems for user-selected viewpoint rendering of a virtual meeting are provided herein. First image data generated by a first client device during a virtual meeting and second image data generated by a second client device during a virtual meeting is obtained. The first image data depicts object(s) captured from a first vantage point and the second image data depicts the object(s) captured from a second vantage point. A request is received from a third client device for third image data depicting the object(s) captured from a third vantage point. The third image data depicting the object(s) corresponding to the third vantage point is generated based on the first image data and the second image data. A rendering of the third image data is provided for presentation via a graphical user interface (GUI) of the third client device during the virtual meeting in accordance with the request.

17 Claims, 11 Drawing Sheets

(56) References Cited

U.S. PATENT DOCUMENTS

| | | | |
|---|---|---|---|
| 2022/0051485 | A1 | 2/2022 | Martin Brualla et al. |
| 2023/0110206 | A1 | 4/2023 | Karras et al. |

OTHER PUBLICATIONS

Ben Mildenhall et al., "NeRF: Representing Scenes as Neural Radiance Fields for View Synthesis", Aug. 3, 2020, pp. 1-25,markomih.github.io/KeypointNeRF, https://doi.org/10.48550/arXiv.2003.08934, arXiv:2003.08934v2 [cs.CV,].

Marko Mihajlovic et al., "KeypointNeRF: Generalizing Image-based Volumetric Avatars using Relative Spatial Encoding of Keypoints", Jul. 21, 2022, pp. 1-24, https://doi.org/10.48550/arXiv.2205.04992, arXiv:2205.04992v2 [cs.CV].

Andrew Nartker, "How we're testing Project Starline at Google", https://blog.google/technology/research/how-were-testing-project-starline-google/, Nov. 30, 2021, 2 pages.

Edgar Tretschk et al., "Non-Rigid Neural Radiance Fields: Reconstruction and Novel View Synthesis of a Dynamic Scene From Monocular Video", Aug. 23, 2021, 20 pages, https://doi.org/10.48550/arXiv.2012.12247, arXiv:2012.12247v4 [cs.CV].

Jikai Zhang et al., "Editable Free-Viewpoint Video using a Layered Neural Representation", ACM Trans. Graph., vol. 40, No. 4, Article 149, Apr. 30, 2021, pp. 149:1-149:18, https://doi.org/10.1145/3450626.3459756, arXiv:2104.14786v1 [cs.CV].

He T., et al., "Deep Voxels++: Enhancing the Fidelity of Novel View Synthesis from 3D Voxel Embeddings," Springer, Nov. 30, 2020, pp. 244-260.

International Search Report and Written Opinion for International Application No. PCT/US2024/028201, mailed Aug. 2, 2024, 16 pages.

Kauff P., et al., "An Immersive 3D Video Conferencing System Using Shared Virtual Team User Environments," Proceedings of the 4th International Conference on Collaborative Virtual Environments, Sep. 30, 2002, pp. 105-112.

Qualcomm: "Use Cases for VR", Qualcomm Incorporated, Dolby Laboratories, S4-160513, 2016, 04 pages, [Retrieved on Apr. 21, 2016] Retrieved from [ http://www.3gpp.org/ftp/tsg_sa/WG4_CODEC/TSGS4_88/Docs/].

* cited by examiner

300

450

USER-SELECTED VIEWPOINT RENDERING OF A VIRTUAL MEETING

TECHNICAL FIELD

Aspects and implementations of the present disclosure relate to user-selected viewpoint rendering of a virtual meeting.

BACKGROUND

A platform can enable users to connect with other users through a video-based or audio-based virtual meeting (e.g., a conference call). The platform can provide tools that allow multiple client devices to connect over a network and share each other's audio data (e.g., a voice of a user recorded via a microphone of a client device) and/or video data (e.g., a video captured by a camera of a client device, or video captured from a screen image of the client device) for efficient communication. In some instances, multiple client devices can capture video and/or audio data for a user, or a group of users (e.g., in the same meeting room), during a virtual meeting. For example, a camera of a first client device (e.g., a personal computer) can capture first image data depicting a user (or group of users) at a first angle or position during a virtual meeting and a second client device (e.g., a mobile device) can capture second image data depicting the user(s) at a second angle or position during the virtual meeting. Other users attending the virtual meeting may view the user(s) at the first angle or position or second angle or position. However, the other users may not be able to view the user(s) at any other angles or positions (e.g., other than the first and/or second angles or positions), as no client device(s) captured image data at the other angles or positions. Accordingly, platforms may be limited in the viewpoints that can be provided to participants during a virtual meeting.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a method is disclosed for user-selected viewpoint rendering of a virtual meeting. The method obtaining, by a processing device associated with a platform, first image data generated by a first client device during a virtual meeting and second image data generated by a second client device during the virtual meeting. The first image data depicts one or more objects captured from a first vantage point and the second image data depicts the one or more objects captured from a second vantage point. The method further includes receiving, by the processing device, a request from a third client device for third image data depicting the one or more objects captured from a third vantage point. The method further includes generating, by the processing device, the third image data depicting the one or more objects corresponding to the third vantage point based on the first image data and the second image data. The method further includes providing, by the processing device, a rendering of the third image data for presentation via a graphical user interface (GUI) of the third client device during the virtual meeting in accordance with the request.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
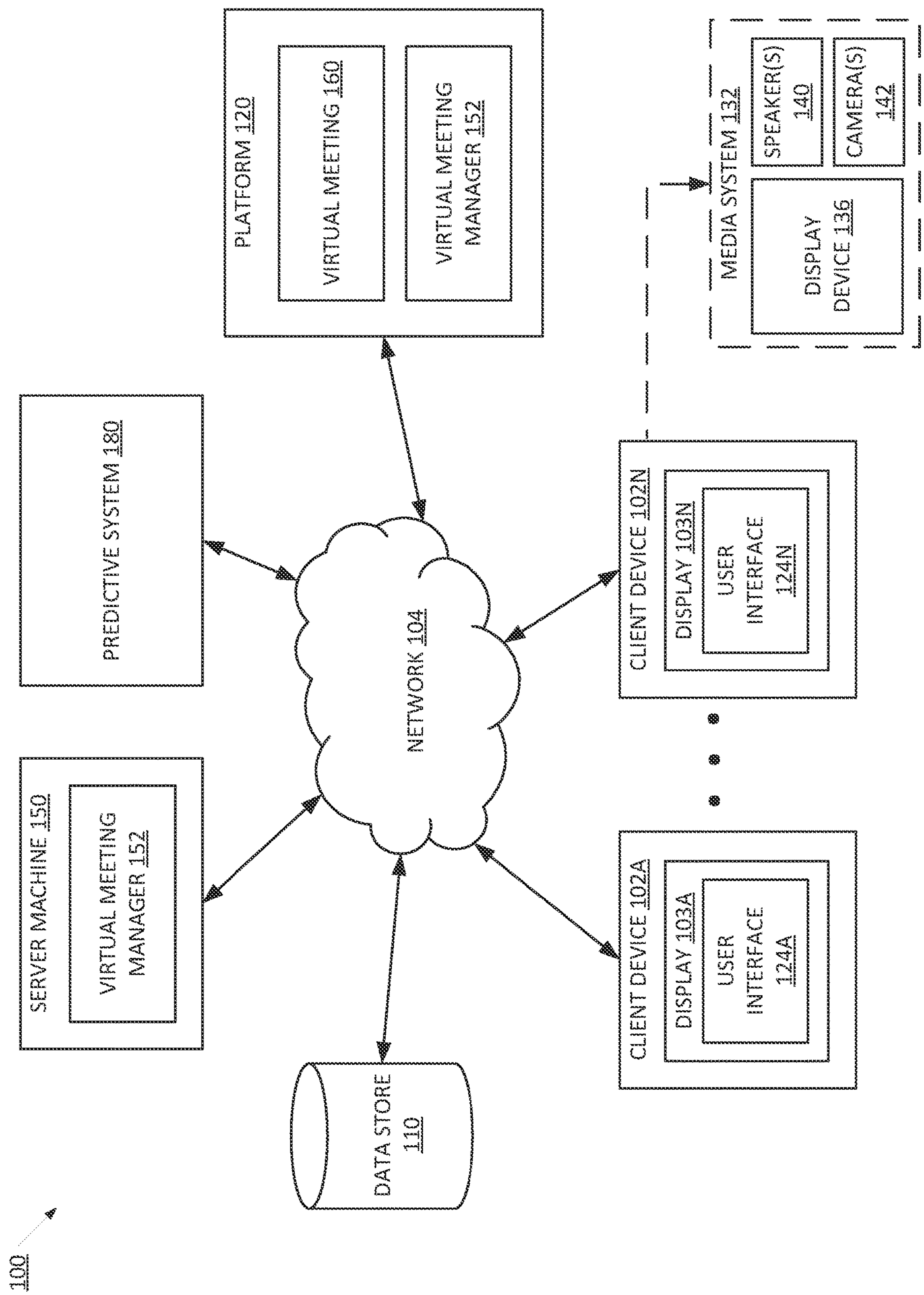
FIG. 1 illustrates an example system architecture, in accordance with implementations of the present disclosure.

Aspects of the present disclosure relate to user-selected viewpoint rendering of a virtual meeting. A platform can enable users to connect with other users through a video or audio-based virtual meeting (e.g., a conference call, etc.). A video-based virtual meeting refers to a meeting during which a client device connected to the platform captures and transmits image data (e.g., collected by a camera of the client device) and/or audio data (e.g., collected by a microphone of the client device) to other client devices connected to the platform. The image data can, in some instances, depict a user or a group of users that are participating in the virtual meeting. The audio data can include, in some instances, an audio recording of audio provided by the user or group of users during the virtual meeting. An audio-based virtual meeting refers to a meeting during which a client device captures and transmits audio data (e.g., without generating and/or transmitting image data) to other client devices connected to the platform.

In some instances, multiple client devices can generate image data for the same or a similar scene during a virtual meeting. In an illustrative example, multiple users may attend an event (e.g., a birthday party, a wedding ceremony, etc.). Each user attending the event (referred to as an attendant) may use a respective client device to capture image data depicting scenes of the event. The client devices can provide the captured image data to the platform and the platform can share the image data with client devices of other users (e.g., that are not attending the event). Each client device capturing image data at the event may be at a different position or angle from other client devices (e.g., associated with other attendants) capturing image data of the event. Accordingly, the image data collected by each respective client device can depict a distinct perspective or viewpoint of the event. In some instances, participants of the virtual meeting that are not attending the event can access the image data depicting each distinct perspective or viewpoint of the event, and be presented with first image data depicting the event at a first perspective or viewpoint (generated by a first client device at the event) via a user interface (UI). In response to a user engaging with one or more elements (e.g., buttons, etc.) of the UI, the platform can provide second image data depicting a second perspective or viewpoint (generated by a second client device at the event) via the UI. Enabling the user to find image data that depicts a perspective or viewpoint of interest to the user can consume a large amount of computing resources (e.g., processing cycles, memory space, etc.) of the client device and/or of the platform. In some instances, the image data collected by the client devices at the event may not depict a perspective or viewpoint of interest to the user. In such instances, the user may not be engaged with the virtual meeting and the image data generated and transmitted to the platform may be wasted.

In other or similar instances, a virtual meeting can involve multiple participants that participate in the virtual meeting at the same location (e.g., in the same conference room during a conference call discussion). In some instances, a single client device (e.g., a dedicated conference room camera, a personal computer, a mobile device, etc.) may be located in the conference room and can generate image data depicting the participants in the conference room at a single position or angle for the duration of the conference call. Other participants of the conference call (e.g., that are accessing the conference call via other client devices connected to the platform) may be unable to view the participants in the conference room at a different position or angle than the position or angle of the client device generating the image data. In some instances, the image data generated by the client device may depict some but not all participants in the conference room. In other or similar instances, one or more participants in the conference room may be located too far or too close to the client device for the client device to generate image data that accurately depicts those participants during the virtual meeting. In the above described instances, the image data depicting the participants in the conference room may not provide other participants of the conference call with a complete view of the participants in the conference room. In at least some of the above described instances, the image data generated by the client device may not depict a speaker or presenter of the conference call discussion. In such instances, the other participants of the conference call (e.g., that are not located in the conference room) may not be able to focus on the speaker or the presenter and therefore may not be fully engaged with the conference call discussion. Further, some client devices (e.g., dedicated conference room cameras, etc.) can be configured to zoom in on a participant in a conference room upon detecting that the participant is speaking or presenting. Other participants or objects of interest may not be depicted in image data that is generated by a client device that is zoomed in on a participant that is speaking or presenting. Accordingly, other participants of the conference call may not be able to view non-speaking or non-presenting participants and/or other objects of interest in the conference room. In some instances, such other participants may not be fully engaged in the conference call. Accordingly, the other participants may not be fully engaged with the virtual meeting and, in some instances, speakers and/or presenters may not communicate clearly and effectively with such participants. Image data that is not of interest to other participants of the virtual meeting is therefore wasted, resulting in unnecessary consumption of computing resources of the client devices that generate the image data, the platform, and/or the client devices that access the image data during the virtual meeting. The consumed resources are unavailable to other processes of the system, which can reduce an overall efficiency and increase an overall latency of the system.

Aspects of the present disclosure address the above and other deficiencies by providing user-selected viewpoint rendering of a virtual meeting. Multiple client devices can be located at distinct positions in an environment prior to or during a virtual meeting. In some embodiments, each client device can be located at a position of the environment corresponding to a distinct vantage point of the environment. One or more participants (or objects) of the virtual meeting can be located in a region of the environment that is within a vantage point of two or more client devices in the environment. In one or more embodiments, the client devices can be placed in locations of the environment such that the image data generated by the multiple client devices corresponds to a 360-degree view of the participant(s) (or object(s)) within the environment. An example set-up of multiple client devices in an environment, according to embodiments of the present disclosure, is provided with respect to FIG. 4A.

During the virtual meeting, each of the multiple client devices can generate image data depicting the participants or object(s) and transmit the generated image data to a platform (e.g., a virtual meeting platform). The platform can provide at least a portion of the image data received from the client devices to additional client devices associated with additional participants of the virtual meeting. In an illustrative example, the platform can provide image data generated by a first client device located in the environment to one or more client devices associated with additional participants of the virtual meeting. An additional participant can access the image data depicting the participant(s) or object(s) in the environment (e.g., generated by the first client device) via a UI of an additional client device associated with the additional participant. The portion of the image data accessed via the UI of the respective additional client device can depict the participant(s) or object(s) in the environment from a perspective or viewpoint corresponding to the distinct vantage point of the first client device in the environment.

In some embodiments, the additional participant that is accessing the image data depicting the perspective or viewpoint of the first client device can provide a request to the additional client device to access image data depicting a different perspective or viewpoint in the environment. The additional participant can provide the request by engaging with one or more UI elements (e.g., buttons) of the UI, in some embodiments. In other or similar embodiments, the additional participant can provide the request by selecting (e.g., clicking, tapping, etc.) a region of the environment depicted by the image data that corresponds to the requested perspective or viewpoint. In additional or alternative embodiments, the additional participant can provide the request by providing a prompt (e.g., a text-based prompt, an audio-based prompt, etc.) to an interface associated with a generative model.

In some embodiments, the requested perspective or viewpoint does not correspond to a vantage point of a client device located in the environment. For example, the additional participant can request a perspective or viewpoint that corresponds to a vantage point between the vantage points of two or more client devices in the environment. The platform can generate image data depicting the participant(s) and/or the object(s) at the requested perspective or viewpoint based on the image data generated by the two or more client devices having the vantage points that surround the vantage point of the requested perspective or viewpoint, as described herein.

In some embodiments, the platform can synchronize the image data generated by the two or more client devices prior to generating the image data depicting the participant(s) and/or the object(s) at the requested perspective or viewpoint. For example, the two or more client devices may by fabricated by different manufacturers and/or may be subject to different image capture settings. Accordingly, the timestamps of image frames generated by the two or more client devices may be different. The platform can determine a difference between the timestamps of the image frames generated by the client devices and can generate a mapping between corresponding image frames generated by the client devices based on the determined timestamp difference to synchronize the image data generated by the client devices. Data indicating the image data generated by the client devices and the generated mappings between the corresponding image frames of the generated image data is referred to herein as synchronized image data. Further details regarding synchronizing the image data and timestamp mapping are described with respect to FIGS. 5 and 6 herein.

In some embodiments, a machine learning model can be trained to predict characteristics (e.g., pixel dimension, pixel depth, color mode, etc.) of image data depicting object(s) in an environment at a target perspective or viewpoint based on given image data depicting the object(s) in the environment at two or more perspectives or viewpoints. The platform can feed the synchronized image data and an indication of the requested perspective or viewpoint as input to the model and can obtain one or more outputs of the model. The one or more outputs can indicate characteristics of image data depicting the participant(s) and/or object(s) in the environment at the requested perspective or viewpoint. The platform can render the image data depicting the participant(s) and/or object(s) at the requested perspective or viewpoint based on the image data indicated by the one or more outputs of the model and can provide the rendered image data to the additional client device (e.g., that provided the request) for presentation to the additional participant of the virtual meeting via a UI of the additional client device. Accordingly, the platform can provide the additional participant with access to an image depicting participant(s) and/or object(s) from a requested perspective or viewpoint in an environment even though no client device in the environment has a vantage point corresponding to the requested perspective or viewpoint.

As indicated above, aspects of the present disclosure cover techniques to enable a user to access images depicting participant(s) or object(s) of a virtual meeting from a requested perspective or viewpoint that does not correspond to a vantage point of a client device generating image data of the participant(s) or object(s) during the virtual meeting. Accordingly, the user can access a perspective or viewpoint of the meeting that is of interest to the user, even though no client devices in the environment of the virtual meeting have a vantage point corresponding to the perspective or viewpoint. As such, the user can be more engaged in the meeting and the overall experience of the user during the virtual meeting can be improved. As the user accesses a perspective or viewpoint of interest and is more engaged in the virtual meeting, image data that is generated by client devices and transmitted to the platform is not wasted and an overall efficiency and overall latency of the system can be improved. In addition, the platform is able to provide, to users, images that depict more perspectives or viewpoints of the virtual meeting than are provided by the vantage points of the client devices capturing the image data in an environment of the virtual meeting and fewer overall client devices may be involved in the setup of the virtual meeting. As fewer client devices are involved in the setup of the virtual meeting, fewer client devices are capturing and transmitting data to the platform, which can further improve an overall efficiency and an overall latency of the system.

FIG. 1 illustrates an example system architecture 100, in accordance with implementations of the present disclosure. The system architecture 100 (also referred to as "system" herein) includes client devices 102A-N (collectively and individually referred to as client device 102 herein), a data store 110, a platform 120, a server machine 150, and/or a predictive system 180 each connected to a network 104. In implementations, network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104.

Platform 120 can enable users of client devices 102A-N to connect with each other via a virtual meeting (e.g., virtual meeting 160). A virtual meeting 160 can be a video-based virtual meeting, which includes a meeting during which a client device 102 connected to platform 120 captures and transmits image data (e.g., collected by a camera of a client device 102) and/or audio data (e.g., collected by a microphone of the client device 102) to other client devices 102 connected to platform 120. The image data can, in some embodiments, depict a user or group of users that are participating in the virtual meeting 160. The audio data can include, in some embodiments, an audio recording of audio provided by the user or group of users during the virtual meeting 160. In additional or alternative embodiments, the virtual meeting 160 can be an audio-based virtual meeting, which includes a meeting during which a client device 102 captures and transmits audio data (e.g., without generating and/or transmitting image data) to other client devices 102 connected to platform 120. In some instances, a virtual meeting can include or otherwise be referred to as a conference call. In such instances, a video-based virtual meeting can include or otherwise be referred to as a video-based conference call and an audio-based virtual meeting can include or otherwise be referred to as an audio-based conference call.

The client devices 102A-N can each include computing devices such as personal computers (PCs), laptops, mobile phones, smart phones, tablet computers, netbook computers, network-connected televisions, etc. In additional or alternative embodiments, client devices 102A-N, or one or more components of client devices 102A-102N, can be included in a virtual reality (VR) system (e.g., a wearable VR system). For example, a client device 102 can be included in a VR headset that is worn by a user of platform 120 (e.g., during a virtual meeting). In some implementations, client devices 102A-N may also be referred to as "user devices." A client device 102 can include an audiovisual component that can generate audio and video data to be streamed to conference platform 120. In some implementations, the audiovisual component can include one or more devices (e.g., a microphone, etc.) that capture an audio signal representing audio provided by the user. The audiovisual component can generate audio data (e.g., an audio file or audio stream) based on the captured audio signal. In some embodiments, the audiovisual component can additionally or alternatively include one or more devices (e.g., a speaker) that output data to a user associated with a particular client device 102. In some embodiments, the audiovisual component can additionally or alternatively include an image capture device (e.g., a camera) to capture images and generate image data (e.g., a video stream) of the captured images.

In some embodiments, one or more client devices 102 can be devices of a physical conference room or a meeting room. Such client devices 102 can be included at or otherwise coupled to a media system 132 that includes one or more display devices 136, one or more speakers 140 and/or one or more cameras 142. A display device 136 can be or otherwise include a smart display or a non-smart display (e.g., a display that is not itself configured to connect to platform 120 or other components of system 100 via network 104). Users that are physically present in the conference room or the meeting room can use media system 132 rather than their own client devices 102 to participate in a virtual meeting, which may include other remote participants. For example, participants in the conference room or meeting room that participate in the virtual meeting may control display 136 to share a slide presentation with, or watch a slide presentation of, other participants that are accessing the virtual meeting remotely. Sound and/or camera control can similarly be performed. As described above, a client device 102 connected to a media system 132 can generate audio and video data to be streamed to platform 120 (e.g., using one or more microphones (not shown), speaker(s) 140 and/or camera(s) 142).

Client devices 102A-N can each include a content viewer, in some embodiments. In some implementations, a content viewer can be an application that provides a user interface (UI) (sometimes referred to as a graphical user interface (GUI)) for users to access a virtual meeting 160 hosted by platform 120. The content viewer can be included in a web browser and/or a client application (e.g., a mobile application, a desktop application, etc.). In one or more examples, a user of client device 102A can join and participate in a virtual meeting 160 via UI 124A presented via display 103A via the web browser and/or client application. A user can also present or otherwise share a document to other participants of the virtual meeting 160 via each of UIs 124A-124N. Each of UIs 124A-124N can include multiple regions that enable presentation of visual items corresponding to video streams of client devices 102A-102N provided to platform 120 during the virtual meeting 160.

In some embodiments, platform 120 can include a virtual meeting manager 152. Virtual meeting manager 152 can be configured to manage a virtual meeting 160 between two or more users of platform 120. In some embodiments, virtual meeting manager 152 can provide UI 142 to each of client devices 102 to enable users to watch and listen to each other during a video conference. Virtual meeting manager 152 can also collect and provide data associated with the virtual meeting 160 to each participant of the virtual meeting 160. Further details regarding virtual meeting manger 152 are provided herein.

In some embodiments, two or more client devices 102 can generate image data (e.g., a video stream) of a participant (or group of participants) or an object (or group of objects) in an environment during a virtual meeting 160. In one example, virtual meeting 160 can correspond to an event, such as a birthday party or a wedding ceremony. A first user can access virtual meeting 160 via UI 124A of client device 102A and a second user can access virtual meeting 160 via UI 124B of client device 102B. The first user can direct a camera component of client device 102A to generate image data depicting one or more objects of the event from a first perspective or viewpoint and the second user can direct a camera component of client device 102B to generate image data depicting the one or more objects from a second perspective or viewpoint. Client device 102A and client device 102B can each transmit the generated image data to platform 120. Other participants of the virtual meeting 160 may access the image data generated by client device 102A and/or client device 102B via a UI 124 of a respective client device 102 associated with the other participants, in some embodiments. In another illustrative example, one or more participants of virtual meeting 160 can be located in a conference room (e.g., that includes media system 132). A camera 142 of media system 132 can capture and transmit image data (e.g., to platform 120) depicting the one or more participants in the conference room at a first perspective or viewpoint. Another camera 142 of media system 132 (or a camera component of a client device 102) can capture and transmit image data (e.g., to platform 120) depicting the one or more participants in the conference room at the second perspective or viewpoint. Other participants of the virtual meeting 160 can access the image data generated by camera(s) 142 and/or the client device(s) 102 via a UI 124 of a respective client device 102 associated with the other participants, as described above.

As indicated above, each client device 102 that generates image data during a virtual meeting 160 can be associated with a distinct vantage point relative to objects in an environment, where each distinct vantage point corresponds to a distinct perspective or viewpoint and represents a location from which the image data is captured during virtual meeting 160. In some embodiments, a participant that is accessing the virtual meeting 160 can request (e.g., via a client device 102) to access image data depicting the objects in the environment at a perspective or viewpoint that does not correspond to a vantage point of a client device in the environment. In response to such a request, platform 120 can generate image data that depicts the objects in the environment at the requested perspective or viewpoint based on image data that is generated by client devices 102 having vantage points that surround the vantage point corresponding to the requested perspective or viewpoint. In some embodiments, platform 120 can generate the image data based on one or more outputs obtained from a machine learning model of predictive system 180. Further details regarding generating image data and predictive system 180 are described herein.

It should be noted that although FIG. 1 illustrates virtual meeting manager 152 as part of platform 120, in additional or alternative embodiments, virtual meeting manager 152 can reside on one or more server machines that are remote from platform 120 (e.g., server machine 150). It should be noted that in some other implementations, the functions of platform 120, server machine 150 and/or predictive system 180 can be provided by more or a fewer number of machines. For example, in some implementations, components and/or modules of platform 120, server machine 150 and/or predictive system 180 may be integrated into a single machine, while in other implementations components and/or modules of any of platform 120, server machine 150 and/or predictive system 180 may be integrated into multiple machines. In addition, in some implementations, components and/or modules of server machine 150 and/or predictive system 180 may be integrated into platform 120.

In general, functions described in implementations as being performed platform 120, server machine 150 and/or predictive system 180 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing a conference call hosted by platform 120. Implementations of the disclosure are not limited to conference platforms and can be extended to any type of virtual meeting. Further, implementations of the present disclosure are not limited to image data collected during a virtual meeting and can be applied to other types of image data (e.g., image data generated and provided to a content sharing platform by a client device 102).

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
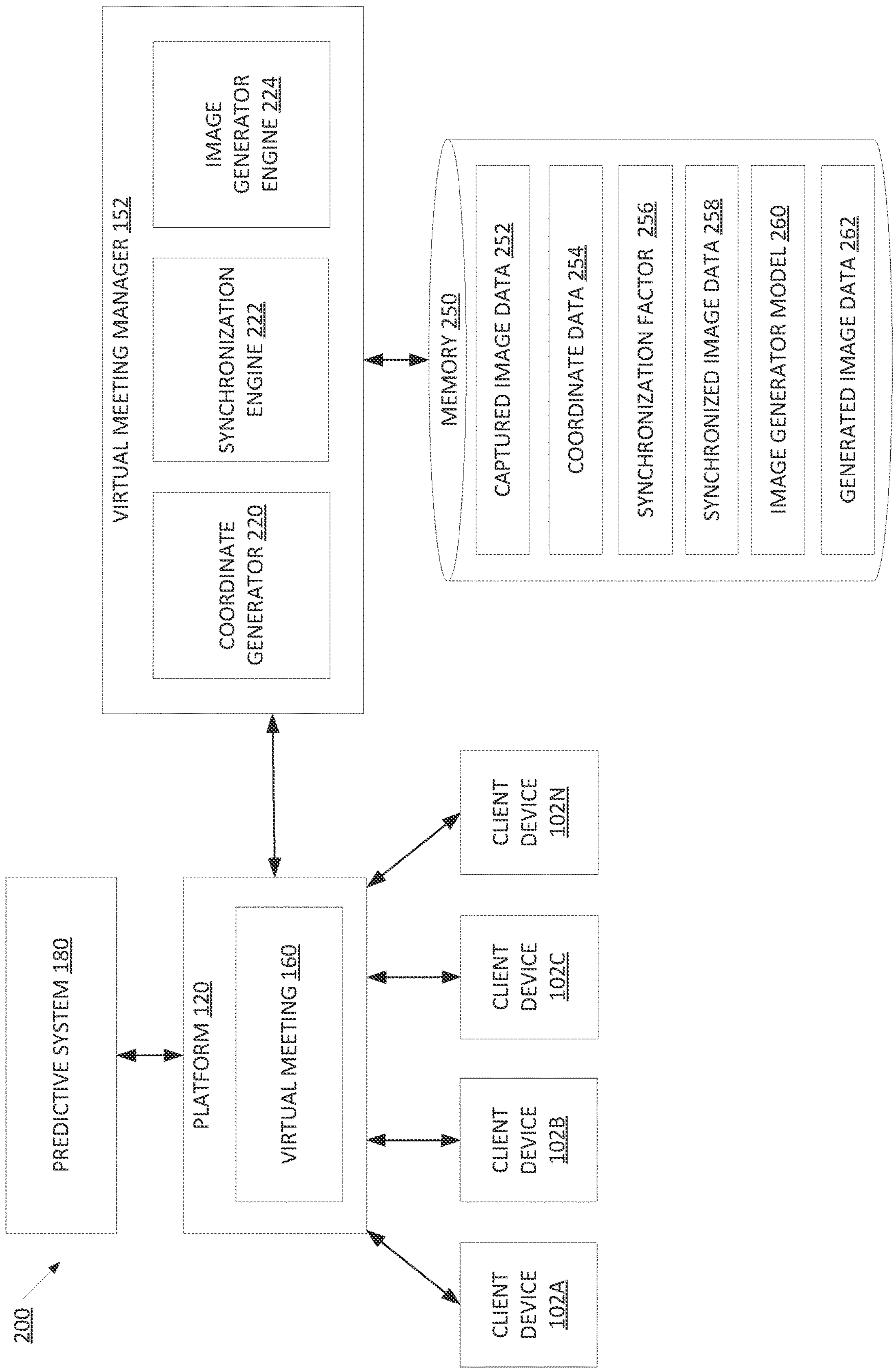
FIG. 2 is a block diagram illustrating an example platform and an example virtual meeting manager, in accordance with implementations of the present disclosure.

FIG. 2 is a block diagram illustrating an example platform 120 and an example virtual meeting manager 152, in accordance with implementations of the present disclosure. As described above, platform 120 can provide users (e.g., of client devices 102) with access to a virtual meeting 160. For example, one or more audiovisual components of a client device 102 (e.g., client device 102A) can generate and transmit image data and/or audio data to platform 120 during virtual meeting 160. Platform 120 can provide the received image data and/or audio data to other client devices 102 (e.g., client device 102B, client device 102C, client device 102D, etc.) during the virtual meeting 160. Virtual meeting manager 152 can manage the virtual meeting 160 between two or more users of platform 120, as described herein. In some embodiments, a user of a client device 102 can request access to image data depicting a particular perspective or viewpoint of participants and/or objects of the virtual meeting 160, as described herein. In response to determining that no camera components of client device(s) 102 have a vantage point corresponding to the particular perspective or viewpoint, virtual meeting manager 152 can generate image data depicting the participants and/or objects at the particular perspective or viewpoint based on image data collected by client devices 102 having vantage points that surround the corresponding vantage point. Details regarding generating the image data are further provided with respect to FIG. 3.

It should be noted that for clarify and simplicity, some embodiments of the present disclosure may refer to image data being generated for one or more object(s) in an environment. However, embodiments of the present disclosure can be applied to image data being generated for one or more participant(s) of a virtual meeting 160. Further, embodiments of the present disclosure can be applied to image data generated outside of a virtual meeting 160. For example, embodiments of the present disclosure can be applied to content generated or otherwise created by a client device 102 and provided to a content sharing platform for access by users of the content sharing platform. In other examples, embodiments of the present disclosure can be applied to content generated by two or more surveillance cameras (e.g., surveilling a house, a building, an interior of a house or a building, etc.), cameras generating image data depicting a stage performance or exhibition, and so forth.

In some embodiments, platform 120 and/or virtual meeting manager 152 can be connected to memory 250 (e.g., via network 104, via a bus, etc.). Memory 250 can correspond to one or more regions of data store 110, in some embodiments. In other or similar embodiments, one or more portions of memory 250 can include or otherwise correspond any memory of or connected to system 100.

Figure 3:
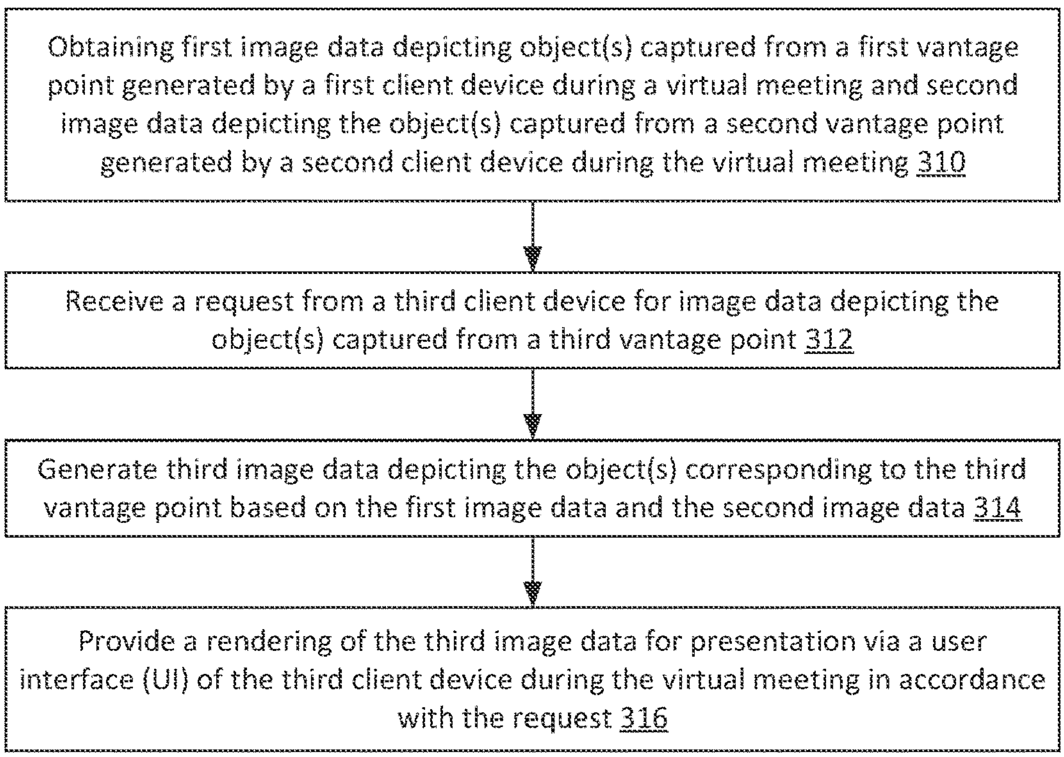
FIG. 3 depicts a flow diagram illustrating an example method for user-selected viewpoint rendering of a virtual meeting, in accordance with implementations of the present disclosure.

FIG. 3 depicts a flow diagram illustrating an example method 300 for user-selected viewpoint rendering of a virtual meeting, in accordance with implementations of the present disclosure. Method 300 can be performed by processing logic that can include hardware (circuitry, dedicated logic, etc.), software (e.g., instructions run on a processing device), or a combination thereof. In one implementation, some or all of the operations of method 300 can be performed by one or more components of system 100 of FIG. 1. In some embodiments, some or all of the operations of method 300 can be performed by virtual meeting manager 152, as described above.

At block 310, processing logic obtains first image data depicting object(s) at a first vantage point captured by a first client device during a virtual meeting and second image data depicting the object(s) at a second vantage point captured by a second client device during the virtual meeting. In some embodiments, the first client device can correspond to client device 102A and the second client device can correspond to client device 102B. Virtual meeting manager 152 can store image data captured by client device 102A, client device 102B, and/or any other client device 102 at memory 250 as captured image data 252, in some embodiments. In some instances, first image data captured by client device 102A is referred to as captured image data 252A (or simply image data 252A) and second image data captured by client device 102B is referred to as captured image data 252B (or simply image data 252B). One or more users associated with client device 102A and/or client device 102B can engage with other users of platform 120 (e.g., associated client device 102 (*d*), etc.) during a virtual meeting 160. In some embodiments, the objects depicted by the first image data 252A and/or the second image data 252B can be or otherwise include the users associated with client device 102A and/or client device 102B. In an illustrative example, one or more participants of virtual meeting 160 can be located in a shared environment, such as a conference room or a meeting room. Client device 102A can be positioned at a first vantage point so to generate the first image data 252A having a first perspective or viewpoint of the participants and client device 102B can be positioned at a second vantage point so to generate the second image data 252B having a second perspective or viewpoint of the participants.

Figure 4A:
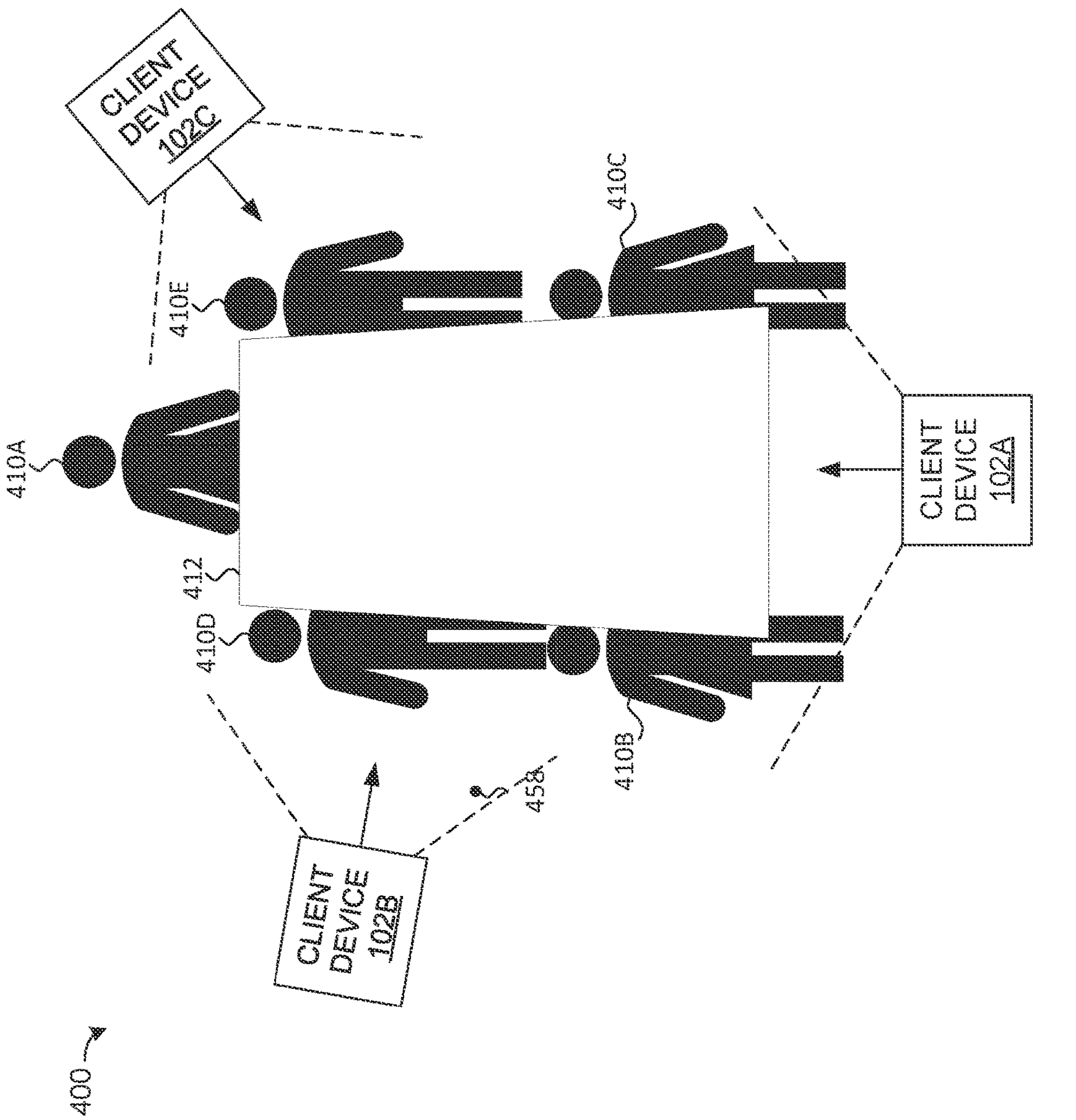
FIG. 4A illustrates an example environment for a virtual meeting, in accordance with implementations of the present disclosure.

FIG. 4A illustrates an example environment 400 for a virtual meeting 160, in accordance with implementations of the present disclosure. For purposes of explanation and illustration only, environment 400 can correspond to an environment in a conference room or a meeting room. However, environment 400 can be any type of environment, such as an environment of an event (e.g., a birthday party, a wedding ceremony, etc.) or any other type of environment.

As illustrated in FIG. 4A, one or more participants 410 can be located in environment 400 during the virtual meeting 160. In an illustrative example, participants 410 can be located around an object 412, such as a conference table object, of environment 400. One or more client devices 102 (or camera components of or connected to client devices 102) can be positioned at distinct regions of environment 400. In some embodiments, one or more client devices 102 of environment 400 can correspond to or otherwise be connected to a device of media system 132. In additional or alternative embodiments, one or more client devices 102 of environment 400 can correspond or otherwise be connected to a personal device (e.g., a mobile device, a personal computer, etc.) associated with a participant 410 of the virtual meeting 160.

As illustrated in FIG. 4A, client device 102A can be positioned in environment 400 at the end of the conference table object 412 in environment 400. Participants 410B and 410C can be closer to client device 102A than participants 410A, 410D and 410E. In some embodiments, participants 410B and 410C may be within a vantage point of client device 102A and/or one or more of portions of participants 410A, 410D, 410E may be outside of the vantage point of client device 102A. In other or similar embodiments, participants 410A, 410D, and/or 410E may be within the vantage point of client device 102A, but details of one or more participants 410A, 410D, 410E may not be visible or detectable within the vantage point of client device 102A. In other or similar embodiments, client device 102B may have a different vantage point of participants 410 and/or conference table object 412 than client device 102A. For example, participant 410B, participant 410D and/or participant 410E may be within the vantage point of client device 102B, while portions of participant 410A and/or participant 410C may be outside of the vantage point of client device 102B. In yet other or similar embodiments, another client device (e.g., client device 102C) may be included in environment 400 and may have a different vantage point of participants 410 than client device 102A and/or client device 102B. For example, participant 410A, participant 410E, and/or participant 410C may be within the vantage point of client device 102C, while portions of participant 410B and/or participant 410D may be outside of the vantage point of client device 102C.

It should be noted that the positioning of client devices 102 in environment 400 is provided solely for the purpose of explanation and illustration and is not intended to be limiting. Environment 400 can include any number of client devices 102 (or camera components connected to client devices 102), and such client devices 102 and/or camera components can be positioned anywhere within environment 400. In some embodiments, client devices 102 (or camera components connected to client devices 102) can be positioned in environment 400 such that the combination of vantage points by each client device 102 provides a 360-degree view of the participants and/or objects 412 in environment 400.

Figure 4B:
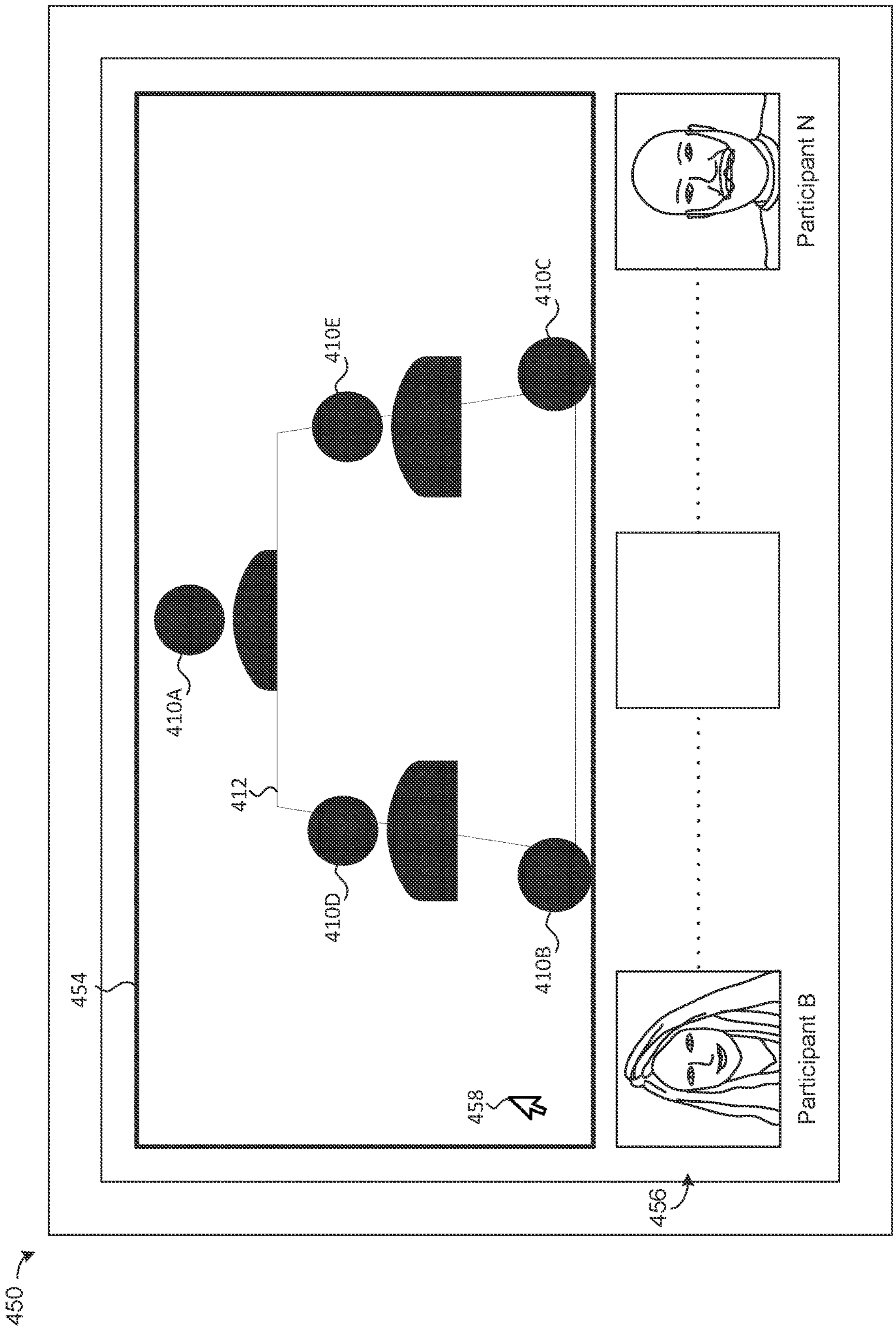
FIGS. 4B-4C illustrate example graphical user interfaces (GUIs), in accordance with implementations of the present disclosure.
Figure 4C:
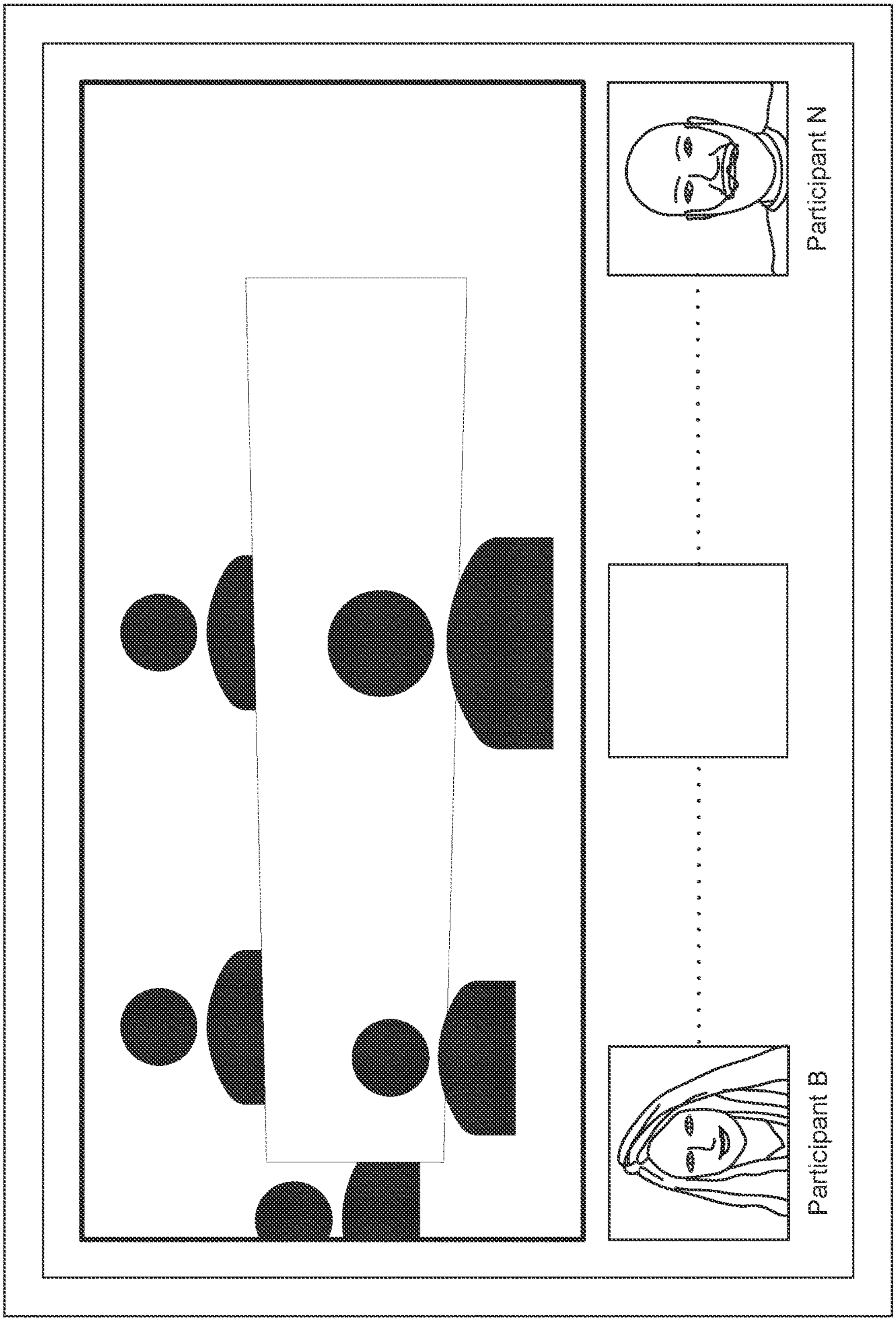

As described above, client devices 102A-102C can generate image data 252 depicting participants 410 and/or object(s) 412 during a virtual meeting 160. Another participant of the virtual meeting can access the image data 252 via a UI 124 of a respective client device associated with the other participant, in some embodiments. FIGS. 4B-4C illustrate example user interfaces (UIs) 450, in accordance with implementations of the present disclosure. FIG. 4B illustrates an example UI 450 that provides image data 252A collected by client device 102A, in accordance with previously described embodiments. As illustrated in FIG. 4B, UI 450 can include a first region 454 and a second region 456. The first region 454 can include a rendering of image data 252 collected by a client device 102 (or a camera component connected to a client device 102) as described above. The second region 456 can include one or more UI elements that depict a rendering of image data 252 collected by other client devices 102 connected to platform 120 during the virtual meeting 160. For example, UI elements of the second region 456 can include a rendering of image data 252 depicting a camera feed of client devices associated with Participant B and Participant N (e.g., who may be joining the virtual meeting 160 remotely. In another example, UI elements of the second region 456 can include a rendering of image data 252 collected by other client devices 102 (e.g., client device 102B, client device 102C, etc.) of environment 400. It should be noted that a rendering any image data 252 generated by client devices 102 can be provided in any region of UI 450. For example, a rendering of image data 252A generated by client device 102A can be provided in a UI element of region 456, in some embodiments. The distribution of rendered image data 252 in regions of UI 450 can be dependent on one or more rules provided by a developer of platform 120, one or more preferences of a user associated with a client device 102 that provides UI 450 to a user, or can be random.

For purposes of explanation and illustration, UI 450 of FIG. 4B can correspond to UI 124D of client device 102D. Client device 102D can be associated with a participant of virtual meeting 160 that is joining the virtual meeting 160 remotely (e.g., Participant B, Participant N, etc.). As illustrated in FIG. 4B, first region 454 can provide a rendering of the image data 252A generated by client device 102A in environment 400. One or more portions of participants 410B and 410C can be within the vantage point of client device 102A, in some embodiments. In additional or alternative embodiments, details of participants 410A, 410D, and/or 410E may not be visible or detectable within the vantage point of client device 102A.

Referring back to FIG. 3, at block 312, processing logic receives a request from a third client device for image data depicting the object(s) at a third vantage point. A user associated with client device 102D can provide a request to access image data depicting participants 410 from a particular perspective or viewpoint. In some embodiments, the user can provide the request by engaging with one or more UI elements (e.g., buttons, etc.) of UI 450. In other or similar embodiments, the user can provide the request by selecting (e.g., clicking, tapping, etc.) a portion of the rendered image data 252A provided via the first region 454 of UI 450 representing a vantage point that corresponds to the particular perspective or viewpoint. For example, as illustrated in FIG. 4B, the user associated with client device 102D can select a region 458 of the rendered image data 252A provided via the first region 454 of UI 450 that represents the vantage point that corresponds to the perspective or viewpoint of interest to the user. Client device 102D can transmit the request to platform 120. The transmitted request can indicate the selected region 458 of the rendered image data 252 provided via the first region 454 of UI 450. In some embodiments, the indication of the selected region 458 can include a set of pixels and/or coordinates associated with the set of pixels at or near the selected region 458 of the rendered image data.

In response to receiving the request, coordinate generator 220 of virtual meeting manager 152 can determine a location of environment 400 that corresponds to the selected region 458. In some embodiments, coordinate generator 220 can access data (e.g., from memory 250) that indicates a distance of client device 102A from a participant 410 and/or object 412 in environment 400. The data can be provided by a user of platform 120 (e.g., a participant 410 in environment 400, a facilitator or administrator of virtual meetings in environment 400, an operator or developer of platform 120), in some embodiments. In other or similar embodiments, the data can be determined by applying one or more distance algorithms between coordinates indicating the position of client device 102A and a position of the participant 410 and/or the object 412 in environment 400. The data accessed by coordinate generator 220 can, in some embodiments, additionally or alternatively indicate a size or dimension associated with the participant 410 and/or the object 412. For example, the data can indicate a width or length of the conference table object 412 in environment 400. In some embodiments, coordinate generator 220 can additionally or alternatively access data that indicates a distance of client device 102B and/or client device 102C from the participant 410 and/or the object 412. Such data can be obtained according to previously described embodiments.

In some embodiments, coordinate generator 220 can calculate coordinates (e.g., Cartesian coordinates, etc.) associated with one or more participants 410 and/or objects 412 in the environment 400 based on the determined distance between client device(s) 102A, 102B, and/or 102C and the participant 410 and/or object 412 in environment 400. The calculated coordinates can be stored at memory 250 as coordinate data 254, in some embodiments. In an illustrative example, coordinate generator 220 can identify a center point of conference table object 412 based on the distance between client device 102A and conference table object 412 and the size or dimension associated with conference table object 412. Coordinate generator 220 can determine that the coordinates associated with the center point of conference table object 412 is approximately (0,0). Coordinate generator 220 can then determine the coordinates associated with the location of client devices 102A, 102B, and/or 102C, participants 410 in environment 400, and/or other objects in environment 400 based on an approximated distance between the center point of conference table object 412 and each respective location. It should be noted that coordinate generator 220 can determine coordinates associated with the participants 410 and/or objects 412 of environment 400 according to other techniques. It should also be noted that coordinate generator 220 can determine the coordinates in environment 400 prior to receiving a request from a client device 102 (e.g., client device 102D) indicating a selected region 458, as described above.

In some embodiments, coordinate generator 220 can additionally or alternatively determine a scaling factor indicating a difference between a size of a participant 410 and/or an object 412 in environment 400 and a size of the participant 410 and/or the object 412 as depicted by image data 252 generated by client device(s) 102A, 102B, and/or 103C. In an illustrative example, coordinate generator 220 can determine a set of pixels associated with conference table object 412 in the image data 252A generated by client device 102A and can determine a dimension of the set of pixels (e.g., X pixels long. Y pixels wide, etc.). Coordinate generator 220 can determine the scaling factor based on the actual size of the conference table object 412 (e.g., as indicated by the data obtained from memory 250) and the determined dimension of the set of pixels.

Coordinate generator 220 can determine coordinates of environment 400 associated with the selected region 458 by the user of client device 102D based on the determined scaling factor and an approximated distance between the selected region 458 and coordinates determined for participants 410 and/or objects 412 in environment 400. In an illustrative example, coordinate generator 220 can determine distance between pixels of image data 252 generated by client device 102 associated with the center of conference table object 412 (e.g., having coordinates 0,0) and pixels of the image data 252 associated with the selected region 458. Coordinate generator 220 can apply (e.g., multiply, etc.) the determined scaling factor to the determined pixel distance to determine the distance between the selected region 458 in environment 400 and the center point of conference table object 412 in environment 400. Coordinate generator 220 can determine coordinates associated with the selected region 458 in environment 400 based on the determined distance. It should be noted that coordinate generator 220 can determine coordinates associated with selected region 458 according to other techniques, in accordance with embodiments of the present disclosure.

Virtual meeting manager 152 can determine whether the coordinates determined for selected region 458 correspond to coordinates for any of client device 102A, 102B, and/or 103C in environment 400. In response to determining that the coordinates for selected region 458 correspond to coordinates for client device 102A, 102B, and/or 103C, virtual meeting manager 152 can identify the image data 252 generated by the client device 102A, 102B, and/or 103C and can provide the identified image data 252 to the user via region 454 of client device 102D. In response to determining that the coordinates for selected region 458 do not correspond to coordinates for client device 102A, 102B, and/or 103C, virtual meeting manager 152 can generate image data depicting the participants 410 and/or the objects 412 in environment 400 from a perspective or viewpoint corresponding to the vantage point of selected region 458, as described herein.

In some embodiments, a user of client device 102D can provide a request for access to image data depicting a particular perspective or viewpoint by providing a prompt (e.g., a text-based prompt, an audio-based prompt, etc.) to an interface associated with a generative model. A generative model refers to a machine learning model or artificial intelligence algorithm that can receive, as an input, a request for content, and can generate the requested content and provide the requested content as an output. In some embodiments, the request can be included in a prompt provided by a user via a prompt interface (not shown). A user can "converse" with the generative model by providing the prompt to the generative model via the prompt interface. One or more outputs of the generative model can mimic natural language or conversation in some embodiments.

In an illustrative example, the user of the client device 102D can provide a prompt to the generative model via the prompt interface. The prompt can include a request to access image data depicting a particular participant 410 or object 412 in environment 400. For example, the prompt can be "Show me Participant 410A in the meeting room." A generative model engine (not shown) can receive the prompt and can parse the prompt to determine the request of the prompt (e.g., to access image data depicting participant 410A in environment 400). In some embodiments, the generative model engine and/or coordinate generator 220 can determine coordinates associated with a location that includes participant 410A (or a vantage point of participant 410A) in environment 400. The coordinates can include coordinates associated with participant 410A and/or coordinates associated with a region around participant 410A. The generative model engine and/or virtual meeting manager 152 can determine whether coordinates for any of client devices 102A, 102B, and/or 102C correspond to the location that includes participant 410A (or a vantage point of participant 410A) in environment 400, as described above. If the coordinates for any of client devices 102A, 102B, and/or 102C correspond to the location that includes participant 410A (or a vantage point of participant 410A), the generative model engine and/or virtual meeting manager 152 can provide image data 252 generated by the client device 102A, 102B, and/or 102C to the user via the first region 454 of UI 450, as described above. If the coordinates do not correspond to the location that includes participant 410A (or the vantage point of participant 410A), the generative model can generate image data depicting participant 410A, as described herein.

Referring back to FIG. 3, at block 314, processing logic (e.g., virtual meeting manger 152, the generative model engine, etc.) generates third image data depicting the object(s) from the third vantage point (e.g., the vantage point of selected region 458) based on the first image data and the second image data. In some embodiments, virtual meeting manager 152 can determine two or more client devices 102 in environment 400 having vantage points that overlap with the vantage point of selected region 458. Said vantage points may surround the vantage point of selected region 458. In some embodiments, virtual meeting manager 152 can determine client devices 102 in environment 400 having vantage points that surround the vantage point of selected region 458 based on determined coordinates for each of client devices 102 in environment 400 and the determined coordinates for selected region 458. In accordance with the example of FIG. 4A, virtual meeting manager 152 may determine that client device 102A and client device 102B have vantage points that surround the vantage point of selected region 458 based on the coordinates of client device 102A, client device 102B, and selected region 458. Accordingly, virtual meeting manager can generate image data depicting participants 410 and/or objects 412 based at least on first image data 252A and second image data 252B.

In some instances, client device 102A and client device 102B may have been fabricated by different manufacturers. In other or similar instances, client device 102A and client device 102B may have different settings (e.g., set by a developer or engineer of client devices 102A and/or 102B and/or a user of client devices 102A and/or 102B). In such instances, a timestamp of image frames of image data 252A may not match (or approximately match) the timestamp of corresponding image frames of image data 252B. In yet other or similar instances, client device 102A and client device 102B may have been fabricated by the same manufacturers and have the same (or similar) settings, but the timestamps of image frames of image data 252A may not match (or approximately match) the timestamp of corresponding image frames of image data 252B. Accordingly, synchronization engine 222 can synchronize image data 252A with image data 252B such that the timestamps of image frames of image data 252A match the timestamps of corresponding image frames of image data 252B. Details regarding synchronizing the image frames of image data 252 are provided with respect to FIGS. 5 and 6 herein.

Figure 5:
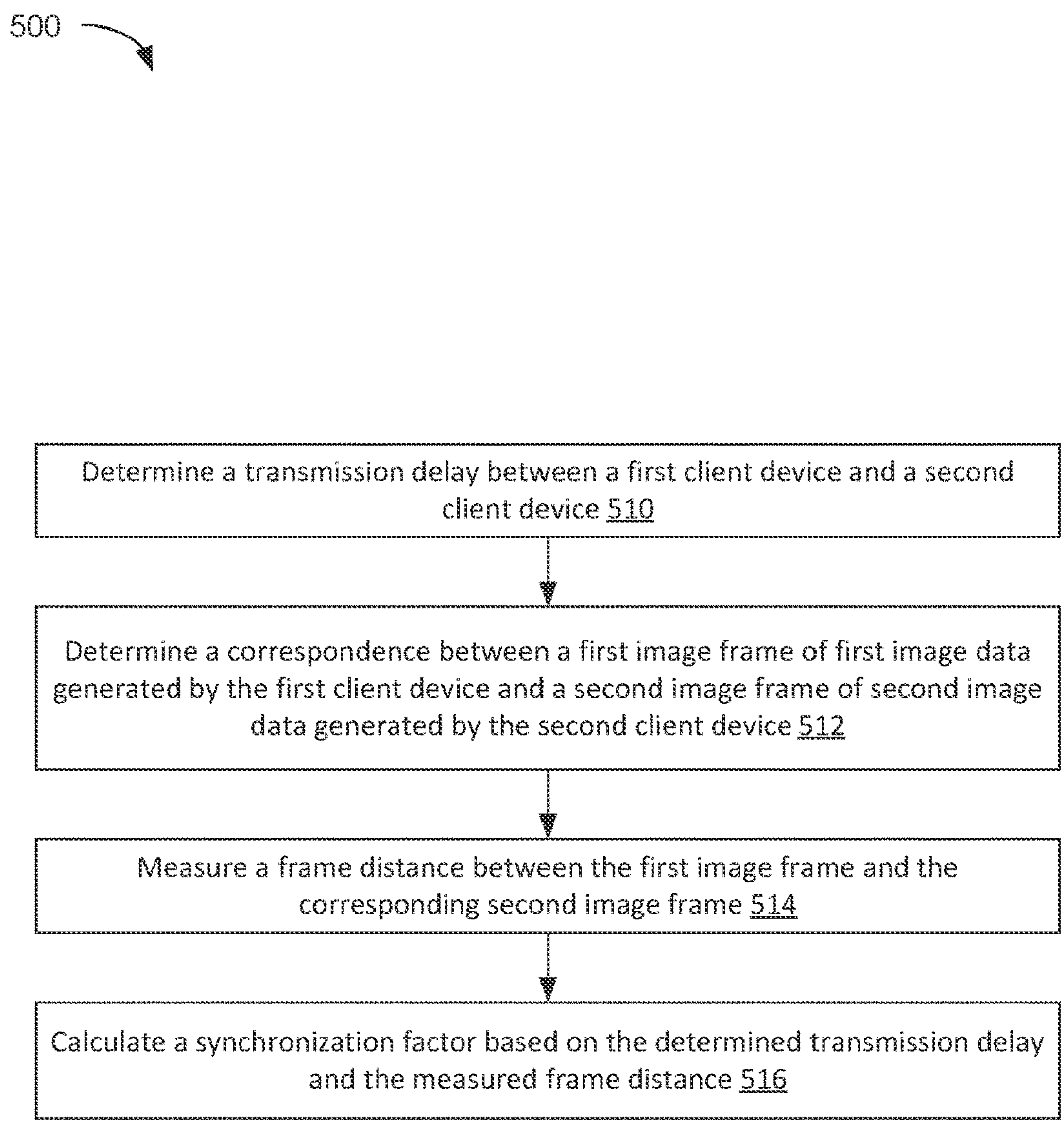
FIG. 5 depicts an example method for synchronizing image frames generated by two or more client devices, in accordance with implementations of the present disclosure.

FIG. 5 depicts an example method 500 for synchronizing image frames generated by two or more client devices, in accordance with implementations of the present disclosure. Method 500 can be performed by processing logic that can include hardware (circuitry, dedicated logic, etc.), software (e.g., instructions run on a processing device), or a combination thereof. In one implementation, some or all of the operations of method 500 can be performed by one or more components of system 100 of FIG. 1. In some embodiments, some or all of the operations of method 500 can be performed by virtual meeting manager 152, as described above. For example, some or all operations of method 500 can be performed by synchronization engine 222 of virtual meeting manager 152.

At block 512, processing logic determines a transmission delay between a first client device (e.g., client device 102A) and a second client device (e.g., client device 102B). The transmission delay can represent a delay between a time period when an image frame is generated by a client device 102 and a time period when the image frame is transmitted from the client device 102 to platform 120 and/or another client device 102. In some embodiments, synchronization engine 222 can transmit an initial message (e.g., a packet) to a client device 102 via network 104 at a first time period. The first time period can be indicated by a time of a network time protocol of platform 120. The message can include an instruction for the client device 102 to transmit a response message to synchronization engine 222 that includes an indication of a second time period at which the initial message was received by the client device 102 and a third time period during which the response is transmitted to time synchronization engine 222. Upon receiving the response message from the client device 102 during a fourth time period, synchronization engine 222 can determine a time of the network time protocol that the response message was received. In some embodiments, synchronization engine 222 can access data of memory 250 indicating a transmission latency between platform 120 and a client device 102 over the network. The transmission latency can be associated with all transmissions between platform 120 and client devices 102 and may be provided by a developer or operator of system 100 and/or measured based on transmissions between platform 120 and client devices 102. Synchronization engine 222 can compare a difference between the first time period (i.e., when the message was transmitted to client device 102) and the second time period (i.e., when the message was received by client device 102), as modified by the transmission latency, to determine a transmission delay between the client device 102 and platform 120, in some embodiments. In additional or alternative embodiments, synchronization engine 222 can compare a difference between the third time period (i.e., when the response message was transmitted by client device 102) and the fourth time period (i.e., when the response message was received by client device 102), as modified by the transmission latency, to determine the transmission delay between the client device 102 and platform 120. In some embodiments, synchronization engine 222 can transmit multiple messages to each client device 102 connected to platform 120 and can measure the transmission delay for each message (and received response message). Synchronization engine 222 can determine an aggregate value (e.g., an average) of each determined transmission delay, which can represent the transmission delay between the platform 120 and the client device 102.

Synchronization engine 222 can determine the transmission delay between the platform 120 and each client device 102, as described above. In some embodiments, synchronization engine 222 can select a reference client device 102 to severe as a client device 102 for which to compare the transmission delay of other client devices 102. Synchronization engine 222 can select the reference client device 102 by determining the client device 102 that first connected to platform 120 to join the virtual meeting 160, the client device 102 having a higher processing capacity than other client devices 102, by random selection, and so forth. In an illustrative example, synchronization engine 222 can select client device 102A as the reference client device. In some embodiments, synchronization engine 222 can determine the transmission delay between the reference client device 102 (e.g., client device 102A) and another client device 102 based on a difference between the measured transmission delay between the platform 120 and the reference client device 102 and the measured transmission delay between the platform 120 and the other client device 102. For example, synchronization engine 222 can determine the transmission delay between client device 102A and client device 102B based on a difference between the measured transmission delay between platform 120 and client device 102A and the measured transmission delay between platform 120 and client device 102B.

In additional or alternative embodiments, a reference client device 102A can measure the transmission delay between the reference client device 102A and other client devices 102 by transmitting the message to the other client devices 102 (e.g., instead of platform 120 transmitting the message), as described above. In such embodiments, the reference client device 102A can measure the transmission delay between the reference client device 102A and the other client device and can provide an indication of the measured transmission delay to synchronization engine 222 (e.g., via network 104).

At block 512, processing logic determines a correspondence between a first image frame of first image data generated by the first client device (e.g., image data 252A) and a second image frame of second image data generated by the second client device (e.g., image data 252B). A correspondence can exist between two or more image frames of image data generated by different client devices 102 if the image frames depict one or more objects of a scene having the same (or approximately the same) state during a particular time period. As indicated above, client device 102A and client device 102B may operate according to different settings or protocols (e.g., as defined by a developer or operator of client device 102A and/or 102B, as defined by a user of client device 102A and/or 102B, etc.). In one illustrative example, client device 102A may generate a different number of image frames in a given time period than client device 102B. For instance, client device 102A may have a frame generation rate of 30 frames per second (fps) while client device 102B may have a frame generation rate of 15 fps. Accordingly, client devices 102A and 102B may not generate image frames at the same frame generation rate. Synchronization engine 222 can determine a correspondence between two or more frames of image data 252A and image data 252B in view of the different frame generation rates of client device 102A and 102B, as described with respect to FIG. 6 below.

Figure 6:
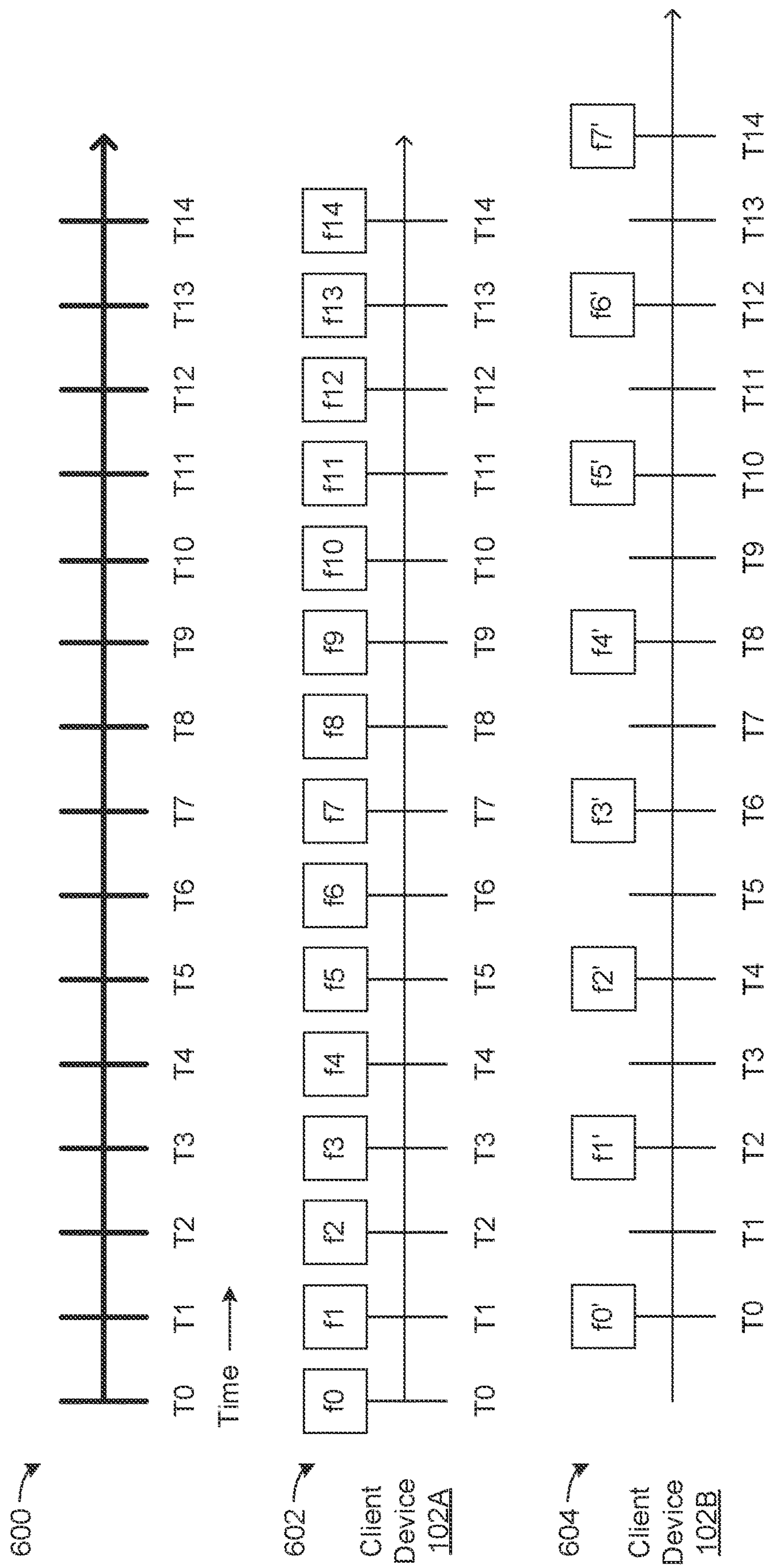
FIG. 6 illustrates example image frames generated by two or more client devices, in accordance with implementations of the present disclosure.

FIG. 6 illustrates example image frames generated by two or more client devices, in accordance with implementations of the present disclosure. Timeline 600 illustrates an example reference timeline. In some embodiments, timestamps of timeline 600 can be defined or otherwise correspond to timestamps of a network time protocol of platform 120. Timeline 602 illustrates example frames generated by client device 102A between time period T0 and time period T14. Time period T0 through time period T14 of timeline 602 can correspond to timestamps of a discrete clocking mechanism of client device 102A. As illustrated in FIG. 6, time periods T0 through T14 of client device 102A match (or substantially match) time periods T0 through T14 of timeline 600. Timeline 604 illustrates example frames generated by client device 102B between time period T0 and time period T14. Time period T0 through time period T14 of timeline 604 can correspond to timestamps of a discrete clocking mechanism of client device 102B. As illustrated in FIG. 6, time periods T0 through T14 of client device 102B do not match time periods T0 through T14 of timeline 600 or timeline 602. Further, as described above, client device 102A can be associated with a different frame generation rate than client device 102B. Accordingly, fewer frames may be generated by client device 102B between time periods T0 through T14 than by client device 102A.

As indicated above, synchronization engine 222 can determine a correspondence between two or more frames of image data 252A and image data 252B in view of different frame generation rates of client devices 102A and 102B. In some embodiments, synchronization engine 222 can extract one or more features from an image frame of image data 252A and one or more features from an image frame of image data 252B and compare the extracted features to determine a degree of similarity between the image frames. A degree of similarity between image frames can be high if the image frames share a large number of common features, while the degree of similarity can be low if the image frames share a small number of common features. In some embodiments, synchronization engine 222 can determine that an image frame of image data 252A corresponds to an image frame of image data 252B if a degree of similarity between the image frames satisfies a similarity condition (e.g., exceeds a threshold value). In an illustrative example, synchronization engine 222 can determine that a degree of similarity between image frame f1 of image data 252A and image frame f0' of image data 252B exceeds the threshold value. Accordingly, synchronization engine 222 can determine a correspondence between image frame f1 of image data 252A and image frame f0' or image data 252B.

Referring back to FIG. 5, at block 514, processing logic measures a frame distance between the first image frame and the corresponding second image frame. A frame distance can represent a temporal distance between a timestamp associated with the first image frame and a timestamp associated with the second image frame. The timestamp associated with an image frame represents a time period that a client device 102 generated the image frame, as defined by the clocking mechanism of client device 102. In accordance with the previous example, the first image frame (e.g., image frame f1) of image data 252A can have a timestamp of T1 and the second image frame (e.g., image frame f0') of image data 252B can have a timestamp of T0. Synchronization engine 222 can determine the frame distance between image frame f1 and image frame f0' based on the difference between timestamp T1 and timestamp TO (e.g., a difference of approximately "1" unit).

At block 516, processing logic calculates a synchronization factor based on the determined transmission delay and the measured frame distance. The synchronization factor can represent a translation that is recognized between image frames of client device 102A and client device 102B in view of the determined transmission delay and the measured frame distance. Synchronization engine 222 can apply the synchronization factor to incoming image data 252 generated by client devices 102A and 102B to obtain synchronized image data 258. The synchronized image data 258 can include a mapping (e.g., representing an alignment) between image frames of incoming image data 252A generated by client device 102A and image frames of incoming image data 252B generated by 102B. Image generator engine 224 can generate image data depicting participants 410 and/or objects 412 in environment 400 from a perspective or viewpoint of selected region 458, as described below.

It should be noted that although some embodiments of the present disclosure describe synchronizing the image frames of image data 252A and image data 252B in response to the request from a user of client device 102D, the synchronization can occur at any time (e.g., prior to the request from the user of client device 102D). Further, embodiments of the present disclosure can be applied to synchronize the image frames of image data 252 generated by each client device 102 in an environment (e.g., client device 102A, client device 102B, client device 102C, etc.). In such embodiments, the synchronization factor can be determined based on the determined transmission delay and the measured frame distance between a selected reference client device (e.g., client device 102A) and each additional client device (e.g., client device 102B, client device 103C, etc.), as described above.

As indicated above, timestamps of image frames of image data 252 generated by different client devices 102 may not align due to different settings of the client devices 102, in some embodiments. In such embodiments, processing logic can estimate and/or calibrate the settings based on the synchronized image data 258. For example, processing logic can obtain synchronized image data 258, as described above. Processing logic can determine a difference in the settings of client devices 102 based on the synchronization factor (e.g., representing the translation or distance between image frames of client devices 102A and 102B). In some embodiments, processing logic can transmit an instruction to client device 102A and/or client device 102B to cause a setting of client device 102A and/or client device 102B to match (or approximately match) the setting of client device 102B and/or client device 102A, respectively.

Figure 7:
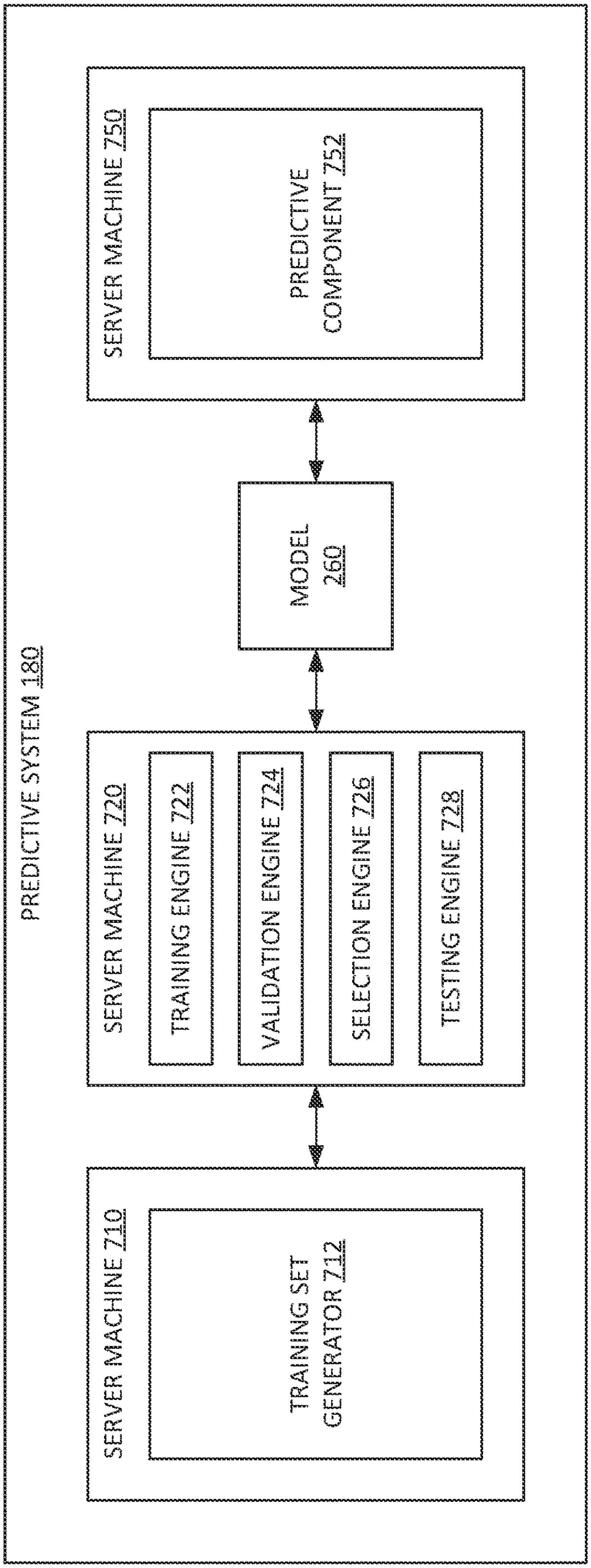
FIG. 7 illustrates an example predictive system, in accordance with implementations of the present disclosure.

In some embodiments, image generator engine 224 can generate image data depicting participants 410 and/or objects 412 in environment 400 from a perspective or viewpoint of selected region 458 based on one or more outputs of a machine learning model of predictive system 180. FIG. 7 illustrates an example predictive system 180, in accordance with implementations of the present disclosure. As illustrated in FIG. 7, predictive system 280 can include a training set generator 712 (e.g., residing at server machine 710), a training engine 722, a validation engine 724, a selection 726, and/or a testing engine 728 (e.g., each residing at server machine 720), and/or a predictive component 752 (e.g., residing at server machine 750). Training set generator 712 may be capable of generating training data (e.g., a set of training inputs and a set of target outputs) to train ML model 260. Details regarding generating training data for training ML model 260 (e.g., the update priority prediction model) are described with respect to FIG. 8 below.

Figure 8:
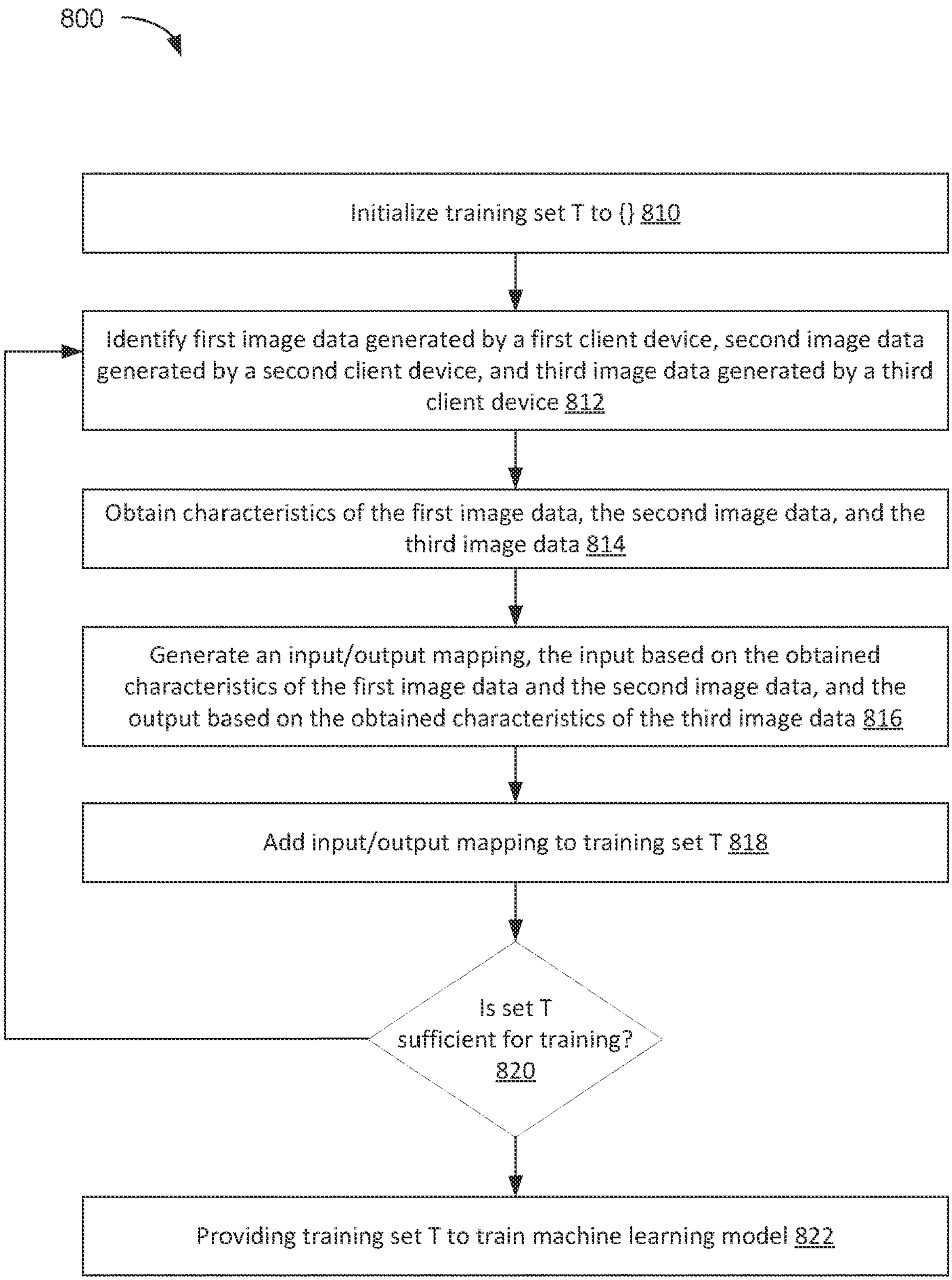
FIG. 8 depicts a flow diagram of an example method for training a machine learning model, in accordance with implementations of the present disclosure.

FIG. 8 depicts a flow diagram of an example method 800 for training a machine learning model, in accordance with implementations of the present disclosure. Method 800 may be performed by processing logic that may include hardware (circuitry, dedicated logic, etc.), software (e.g., instructions run on a processing device), or a combination thereof. In one implementation, some or all the operations of method 800 may be performed by one or more components of system 100 of FIG. 1 and/or one or more components of FIG. 2. In some embodiments, one or more operations of method 800 may be performed by one or more components of predictive system 180. For example, one or more operations of method 800 can be performed by training set generator 712, in some embodiments.

At block 810, processing logic initializes a training set T to null (e.g., { }). At block 812, processing logic identifies first image data generated by a first client device, a second image data generated by a second client device, and third image data generated by a third client device. Each of the first image data, the second image data, and the third image data can be prior image data generated during a prior virtual meeting, in some embodiments. In other or similar embodiments, the first image data, the second image data, and the third image data can be prior image data generated by respective client devices at any time (e.g., outside of a prior virtual meeting). In some embodiments, each of the first image data, the second image data, and the third image data can depict one or more objects at distinct perspectives or viewpoints. For example, the first image data can depict the object(s) at a first perspective or viewpoint, the second image data can depict the object(s) at a second perspective or viewpoint, and the third image data can depict the object(s) at the third perspective or viewpoint. In some embodiments, the first perspective or viewpoint can correspond to a first vantage point in an environment that included the object(s), and the second perspective or viewpoint can correspond to a second vantage point in the environment that included the object(s). The first vantage point and the second vantage point can surround (e.g., be located on either side of) a third vantage point corresponding to the third perspective or viewpoint, in some embodiments.

In some embodiments, processing logic can synchronize the first image data, the second image data, and the third image data. For example, processing logic can determine a synchronization factor associated with at least a portion of the first image data, the second image data, and the third image data, as described above. Processing logic can apply the synchronization factor to a remaining portion of the first image data, the second image data, and the third image data to synchronize (or align) the image frames of the first image data, the second image data, and the third image data, in accordance with previously described embodiments.

At block 814, processing logic obtains characteristics of the first image data, the second image data, and the third image data. In some embodiments, the characteristics can include a pixel color and/or a pixel density of pixels of one or more image frames of the respective image data. In an illustrative example, processing logic can identify a first image frame of the first image data that is synchronized or aligned with a second image frame of the second image data and a third image frame of the third image data. Processing logic can extract the first characteristics from the first image frame, second characteristics from the second image frame, and the third characteristics from the third image frame, in some embodiments. In additional or alternative embodiments, processing logic can extract characteristics from each synchronized image frame and/or from each non-synchronized image frame of the first image data, the second image data, and the third image data. In some embodiments, processing logic can calculate (or otherwise obtain) a relative position that each image frame was captured based on features of the image frames. The calculated position can be included in characteristics of the image data, as described above.

At block 816, processing logic generates an input/output mapping. The input mapping can be generated based on the obtained characteristics of the first image data and the second image data. The output can be generated based on the obtained characteristics of the third image data. The generated input/output mapping can represent training data that is provided to train model 260, as described below. It should be noted that in some embodiments, processing logic may generate the training data without generating an input/output mapping. For example, processing logic can provide the obtained characteristics of the first image data, the second image data, and the third image data to the machine learning model (e.g., a neural network). A difference between pixels of the image frames in the image data can be used to tune weights of the neural network.

At block 818, processing logic adds the generated training data to training set T. At block 820, processing logic determines whether set T is sufficient for training. In response to processing logic determining that set T is not sufficient for training (e.g., an amount of training data of the training set T falls below a threshold value), method 800 returns to block 812. In response to determining that set T is sufficient for training, method 800 proceeds to block 822. At block 822, processing logic provides training set T to train machine learning model 260 of predictive system 180. In some embodiments, training set generator 712 provides the training set T to training engine 722.

Referring back to FIG. 7, training engine 722 can train a machine learning model 260 using the training data (e.g., training set T) from training set generator 712. The machine learning model 260 can refer to the model artifact that is created by the training engine 722 using the training data that includes training inputs and/or corresponding target outputs (correct answers for respective training inputs). The training engine 722 can find patterns in the training data that map the training input to the target output (the answer to be predicted), and provide the machine learning model 260 that captures these patterns. The machine learning model 260 can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In one aspect, the training set is obtained by training set generator 712 hosted by server machine 710.

Validation engine 724 may be capable of validating a trained machine learning model 260 using a corresponding set of features of a validation set from training set generator 712. The validation engine 724 may determine an accuracy of each of the trained machine learning models 260 based on the corresponding sets of features of the validation set. The validation engine 724 may discard a trained machine learning model 260 that has an accuracy that does not meet a threshold accuracy. In some embodiments, the selection engine 726 may be capable of selecting a trained machine learning model 260 that has an accuracy that meets a threshold accuracy. In some embodiments, the selection engine 726 may be capable of selecting the trained machine learning model 260 that has the highest accuracy of the trained machine learning models 260.

The testing engine 186 may be capable of testing a trained machine learning model 260 using a corresponding set of features of a testing set from training set generator 712. For example, a first trained machine learning model 260 that was trained using a first set of features of the training set may be tested using the first set of features of the testing set. The testing engine 728 may determine a trained machine learning model 260 that has the highest accuracy of all of the trained machine learning models based on the testing sets.

Predictive component 752 of server machine 750 may be configured to feed image data 252 generated by two or more client devices 102 as input to a trained model 260 and obtain one or more outputs of model 260. In some embodiments, platform 120 can continue to receive image data 252A from client device 102A and image data 252B from client device 102B during and after client device 102D provides request to access the image data depicting the perspective or viewpoint of the selected region 458. Image generator engine 224 can apply synchronization factor 256 to image frames of the continuously received image data 252 to generate synchronized image data 258, as described above. In some embodiments, image generator engine 224 can provide the generated synchronized image data 258 to predictive component 752 and/or predictive component 752 can obtain the synchronized image data 258 from memory 250. As described above, the synchronized image data 258 can include image frames of image data 252A and image data 252B and a mapping indicating an alignment between one or more corresponding frames of image data 252A and image data 252B. Predictive component 752 can provide the synchronized image data 258 as input to trained model 260 and can obtain one or more outputs of model 260. In additional or alternative embodiments, predictive component 752 can extract features of synchronized image frames from synchronized image data 258 and can provide the extracted features as input to model 260.

In some embodiments, the one or more outputs of model 260 can include one or more sets of image features each indicating features of one or more image frames of an image depicting the participants 410 and/or objects 412 of environment 400 at the perspective or viewpoint of the requested region 458. The one or more outputs can further include, for each set of image features, an indication of a level of confidence that a respective set of image features corresponds to the perspective or viewpoint of the requested region 458. Predictive component 752 and/or image generator engine 224 can identify a set of image features having an indicated level of confidence that satisfies one or more confidence criteria (e.g., exceeds a level of confidence threshold, is larger than other levels of confidence indicated for other sets of image features, etc.). Predictive component 752 and/or image generator engine 224 can extract the identified set of image features from the one or more obtained outputs of model 260. The extracted set of image features can be stored at memory 250 as generated image data 262, in some embodiments.

As indicated above, in some embodiments, model 260 can be a trained generative machine learning model. In such embodiments, model 260 can generate new image data based on the provided input image data 252. The generative machine learning model 260 can be supported by an AI server (not shown), in some embodiments. In some embodiments, the AI server can provide a query tool, which enables one or more users of platform 120 to access the generative machine learning model. The query tool can include or otherwise interface with a prompt interface described above). The query tool can be configured to perform automated identification and facilitate retrieval of relevant and timely contextual information for quick and accurate processing of user queries by model 260. As describe above, a user's request via the prompt interface can include a request to access image data depicting a particular participant 410 and/or object 412 in environment 400. Via network 104 (or another network), the query tool may be in communication with one or more client devices 102, the AI server, data store 110, memory 250, and/or platform 120. Communications between the query tool and the AI server may be facilitated by a generative model application programming interface (API), in some embodiments. Communications between the query tool and data store 110 and/or memory 250 via a data management API, in some embodiments. In additional or alternative embodiments, the generative model API can translate queries generated by the query tool into unstructured natural-language format and, conversely, translate responses received from model 260 into any suitable form (e.g., including any structured proprietary format as may be used by the query tool). Similarly, the data management API can support instructions that may be used to communicate data requests to data store 110 and/or memory 250 and formats of data received from data store 110 and/or memory 250.

As indicated above, a user can interact with the query tool via the prompt interface. The prompt interface be or otherwise include a UI element that can support any suitable types of user inputs (e.g., textual inputs, speech inputs, image inputs, etc.). The UI element may further support any suitable types of outputs (e.g., textual outputs, speech outputs, image outputs, etc.). In some embodiments, the UI element can be a web-based UI element, a mobile application-supported UI element, or any combination thereof. The UI element can include selectable items, in some embodiments, that enables a user to select from multiple generative models 260. The UI element can allow the user to provide consent for the query tool and/or generative model 260 to access user data or other data associated with a client device 102 stored in data store 110 and/or memory 250, process, and/or store new data received from the user, and the like. The UI element can additionally or alternatively allow the user to withhold consent to provide access to user data to the query tool and/or generative model 260. In some embodiments, a user input entered via the UI element may be communicated to the query tool via a user API. The user API can be located at the client device 102 of the user accessing the query tool.

In some embodiments, the query tool can include a user query analyzer to support various operations of this disclosure. For example, the user query analyzer may receive a user input, e.g., user query, and generate one or more intermediate queries to generative model 260 to determine what type of user data the generative model 260 might need to successfully respond to user input. Upon receiving a response from generative model 260, the user query analyzer may analyze the response, form a request for relevant contextual data for data store 110 and/or memory 250, which may then supply such data. The user query analyzer may then generate a final query to generative model 260 that includes the original user query and the contextual data received from data store 110 and/or memory 250. In some embodiments, the user query analyzer may itself include a lightweight generative model that may process the intermediate query(ies) and determine what type of contextual data may have to be provided to generative model 260 together with the original user query to ensure a meaningful response from generative model 260.

The query tool may include (or may have access to) instructions stored on one or more tangible, machine-readable storage media of a server machine (e.g., server machine 750) and executable by one or more processing devices of server machine 750. In one embodiment, the query tool may be implemented on a single machine. In some embodiments, the query tool may be a combination of a client component and a server component. In some embodiments the query tool may be executed entirely on the client device(s) 102. Alternatively, some portion of the query tool may be executed on a client computing device while another portion of the query tool may be executed on a server machine.

Referring back to FIG. 3, processing logic provides a rendering of the third image data (e.g., depicting the participants 410 and/or objects 412 of environment 400 at the perspective or viewpoint of the requested region 458) for presentation via a UI of the third client device (e.g., client device 102D) during the virtual meeting in accordance with the request. In some embodiments, image generator engine 224 can render generated image data 262 to generate the rendering of the third image data. Image generator engine 224 can provide the rendered image data 262 to client device 102D for presentation via UI 450. In other or similar embodiments, a rendering engine of client device 102D can obtain the generated image data 262 (e.g., from memory 250, via transmission from platform 120) and can render the generated image data 262. Client device 102D can provide the rendered image data 262 to the user associated with client device 102D via the first region of UI 450, as described herein. FIG. 4C illustrates another example user interface 450, in accordance with implementations of the present disclosure. As illustrated in FIG. 4C, UI 450 can include a rendering of the generated image data 262 depicting the participants 410 and/or objects 412 of environment 400 at the perspective or viewpoint of the requested region 458.

Figure 9:
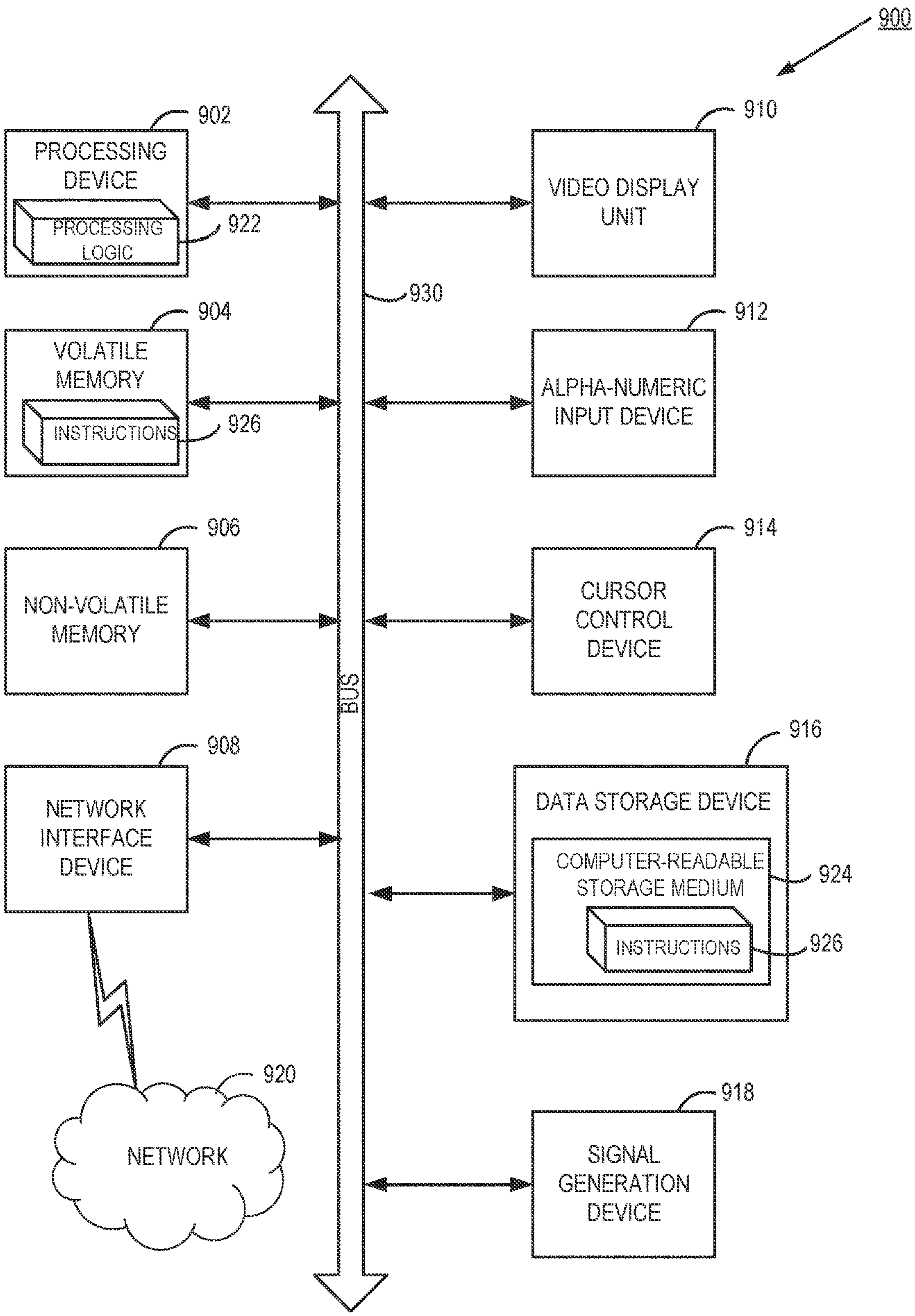
FIG. 9 is a block diagram illustrating an exemplary computer system, in accordance with implementations of the present disclosure.

FIG. 9 is a block diagram illustrating an exemplary computer system 900, in accordance with implementations of the present disclosure. The computer system 900 can correspond to platform 120 and/or client devices 102A-N, described with respect to FIG. 1. Computer system 900 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (processor) 902, a main memory 904 (e.g., read-only memory (ROM), flash memory, dynamic random access memory (DRAM) such as synchronous DRAM (SDRAM), double data rate (DDR SDRAM), or DRAM (RDRAM), etc.), a static memory 906 (e.g., flash memory, static random access memory (SRAM), etc.), and a data storage device 918, which communicate with each other via a bus 940.

Processor (processing device) 902 represents one or more general-purpose processing devices such as a microprocessor, central processing unit, or the like. More particularly, the processor 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 can also be one or more special-purpose processing devices such as an application specific integrated circuit (ASIC), a field programmable gate array (FPGA), a digital signal processor (DSP), network processor, or the like. The processor 902 is configured to execute instructions 905 (e.g., improving precision of content matching systems at a platform) for performing the operations discussed herein.

The computer system 900 can further include a network interface device 908. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 920 (e.g., a speaker).

The data storage device 918 can include a non-transitory machine-readable storage medium 924 (also computer-readable storage medium) on which is stored one or more sets of instructions 905 (e.g., improving precision of content matching systems at a platform) embodying any one or more of the methodologies or functions described herein. The instructions can also reside, completely or at least partially, within the main memory 904 and/or within the processor 902 during execution thereof by the computer system 900, the main memory 904 and the processor 902 also constituting machine-readable storage media. The instructions can further be transmitted or received over a network 930 via the network interface device 908.

In one implementation, the instructions 905 include instructions for providing fine-grained version histories of electronic documents at a platform. While the computer-readable storage medium 924 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

obtaining, by a processing device associated with a platform, first image data generated by a first client device at a particular location during a virtual meeting and second image data generated by a second client device at the particular location during the virtual meeting, wherein the first image data depicts one or more objects captured from a first vantage point of the particular location and the second image data depicts the one or more objects captured from a second vantage point of the particular location;

receiving, by the processing device, a request from a third client device for third image data depicting the one or more objects captured from a third vantage point, wherein the first vantage point and the second vantage point surround the third vantage point;

determining whether the third image data depicting the one or more objects from the third vantage point is to be generated;

responsive to determining that the third image data is to be generated:

providing the first image data, the second image data, and an indication of the third vantage point as input to a machine learning model, wherein the machine learning model is trained to predict characteristics of an image depicting objects captured from a particular vantage point based on characteristics of given image data corresponding to two or more different vantage points; and extracting, from one or more outputs of the machine learning model, characteristics of the image depicting the one or more objects corresponding to the third vantage point;

generating, by the processing device, the third image data depicting the one or more objects corresponding to the third vantage point based on the obtained extracted characteristics; and providing, by the processing device, a rendering of the third image data for presentation via a graphical user interface (GUI) of the third client device during the virtual meeting in accordance with the request.

2. The method of claim 1, wherein the characteristics of the image depicting the one or more objects corresponding to the third vantage point comprises at least one of a color of each of a set of pixels of the image or a density of each of the set of pixels of the image.

3. The method of claim 1, wherein the machine learning model is a generative artificial intelligence model.

4. The method of claim 3, wherein the request from the third client device for the third image data depicting the one or more objects corresponding to the third vantage point is included in a prompt for a generative artificial intelligence model.

5. The method of claim 1, wherein the request from the third client device for the third image data depicting the one or more objects corresponding to the third vantage point is received responsive to detecting a user selection of a region of interest via the GUI of the third client device.

6. The method of claim 1, further comprising:

determining a transmission delay between the first client device and the second client device;

determining a correspondence between a first image frame of the first image data and a second image frame of the second image data;

measuring a frame distance between the first image frame and the second image frame; and calculating a synchronization factor based on the determined transmission delay and the measured frame distance, wherein the third image data is further generated based on the synchronization factor.

7. The method of claim 1, wherein the processing device resides at the first client device or the second client device.

8. The method of claim 1, wherein the processing device is comprised in a cloud-based computing system.

9. A system comprising:

a memory device; and a processing device coupled to the memory device, the processing device to perform operations comprising:

obtaining first image data generated by a first client device at a particular location during a virtual meeting and second image data generated by a second client device at the particular location during the virtual meeting, wherein the first image data depicts one or more objects captured from a first vantage point of the particular location and the second image data depicts the one or more objects captured from a second vantage point of the particular location;

receiving a request from a third client device for third image data depicting the one or more objects captured from a third vantage point, wherein the first vantage point and the second vantage point surround the third vantage point;

determining whether the third image data depicting the one or more objects from the third vantage point is to be generated;

responsive to determining that the third image data is to be generated:

providing the first image data, the second image data, and an indication of the third vantage point as input to a machine learning model, wherein the machine learning model is trained to predict characteristics of an image depicting objects captured from a particular vantage point based on characteristics of given image data corresponding to two or more different vantage points; and extracting, from one or more outputs of the machine learning model, characteristics of the image depicting the one or more objects corresponding to the third vantage point;

generating the third image data depicting the one or more objects corresponding to the third vantage point based on the obtained extracted characteristics; and providing a rendering of the third image data for presentation via a graphical user interface (GUI) of the third client device during the virtual meeting in accordance with the request.

10. The system of claim 9, wherein the characteristics of the image depicting the one or more objects corresponding to the third vantage point comprises at least one of a color of each of a set of pixels of the image or a density of each of the set of pixels of the image.

11. The system of claim 9, wherein the machine learning model is a generative artificial intelligence learning model.

12. The system of claim 11, wherein the request from the third client device for the third image data depicting the one or more objects corresponding to the third vantage point is included in a prompt for a generative artificial intelligence model.

13. The system of claim 9, wherein the request from the third client device for the third image data depicting the one or more objects corresponding to the third vantage point is received responsive to detecting a user selection of a region of interest via the GUI of the third client device.

14. The system of claim 9, wherein the operations further comprise:

determining a transmission delay between the first client device and the second client device;

determining a correspondence between a first image frame of the first image data and a second image frame of the second image data;

measuring a frame distance between the first image frame and the second image frame; and calculating a synchronization factor based on the determined transmission delay and the measured frame distance, wherein the third image data is further generated based on the synchronization factor.

15. A non-transitory computer readable storage medium comprising instructions for a server that, when executed by a processing device, cause the processing device to perform operations comprising:

obtaining first image data generated by a first client device at a particular location during a virtual meeting and second image data generated by a second client device at the particular location during the virtual meeting, wherein the first image data depicts one or more objects captured from a first vantage point of the particular location and the second image data depicts the one or more objects captured from a second vantage point of the particular location;

receiving a request from a third client device for third image data depicting the one or more objects captured from a third vantage point, wherein the first vantage point and the second vantage point surround the third vantage point;

determining whether the third image data depicting the one or more objects from the third vantage point is to be generated;

responsive to determining that the third image data is to be generated:

providing the first image data, the second image data, and an indication of the third vantage point as input machine learning model, wherein the machine learning model is trained to predict characteristics of an image depicting objects captured from a particular vantage point based on characteristics of given image data corresponding to two or more different vantage points; and extracting, from one or more outputs of the machine learning model, characteristics of the image depicting the one or more objects corresponding to the third vantage point;

generating the third image data depicting the one or more objects corresponding to the third vantage point based on the extracted characteristics; and providing a rendering of the third image data for presentation via a graphical user interface (GUI) of the third client device during the virtual meeting in accordance with the request.

16. The non-transitory computer readable storage medium of claim 15, wherein the characteristics of the image depicting the one or more objects corresponding to the third vantage point comprises at least one of a color of each of a set of pixels of the image or a density of each of the set of pixels of the image.

17. The non-transitory computer readable storage medium of claim 15, wherein the machine learning model is a generative artificial intelligence model.

* * * * *